(12) United States Patent
Honda et al.

(10) Patent No.: US 7,158,934 B2
(45) Date of Patent: *Jan. 2, 2007

(54) SPEECH RECOGNITION WITH FEEDBACK FROM NATURAL LANGUAGE PROCESSING FOR ADAPTATION OF ACOUSTIC MODEL

(75) Inventors: Hitoshj Honda, Tokyo (JP); Masanori Omote, Kanagawa (JP); Hiroaki Ogawa, Chiba (JP); Hongchang Pao, Tokyo (JP)

(73) Assignee: Sony Corporation, Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 11/075,560

(22) Filed: Mar. 8, 2005

(65) Prior Publication Data

US 2005/0149318 A1    Jul. 7, 2005

Related U.S. Application Data

(63) Continuation of application No. 09/676,644, filed on Sep. 29, 2000, now Pat. No. 6,879,956.

(30) Foreign Application Priority Data

Sep. 30, 1999  (JP) ................................. 11-277745

(51) Int. Cl.
*G10L 15/06* (2006.01)
*G10L 15/18* (2006.01)
(52) U.S. Cl. ....................... 704/244; 704/257
(58) Field of Classification Search ................ 704/231, 704/243, 244, 251, 255, 257, 1, 9
See application file for complete search history.

(56) References Cited

U.S. PATENT DOCUMENTS 5,027,406 A * 6/1991 Roberts et al. ............. 704/244
5,428,707 A * 6/1995 Gould et al.
5,687,288 A * 11/1997 Dobler et al.
5,729,659 A * 3/1998 Potter ......................... 704/270

(Continued)

FOREIGN PATENT DOCUMENTS

EP         0 773 532    *   5/1997

(Continued)

OTHER PUBLICATIONS

"Distinction at Exit Between Text Editing and Speech Recognition Adaption" IBM Technical Disclosure Bulletin, US, IBM Corp. 37, No. 10, Oct. 1, 1994, p. 391 XP000475710 ISSN: 0018-8689.*

(Continued)

*Primary Examiner*—Martin Lerner
(74) *Attorney, Agent, or Firm*—Frommer Lawrence & Haug LLP; William S. Frommer

(57) ABSTRACT

A speech processing system including a speech recognition unit to receive input speech, and a natural language processor. The speech recognition unit performs speech recognition on input speech using acoustic models to produce a speech recognition result. The natural-language processor performs natural language processing on speech recognition result, and includes: a speech zone detector configured to detect correct zones from the speech recognition result; a feedback unit to feed back information obtained as a result of the natural language processing performed on the speech recognition result to said speech recognition unit. The feedback information includes the detected correct zones. The speech recognition unit includes an adaptation processor to process the feedback information to adapt the acoustic models so that the speech recognition unit produces the speech recognition result with higher precision than when the adaptation processor is not used.

1 Claim, 31 Drawing Sheets

U.S. PATENT DOCUMENTS

| | | | |
|---|---|---|---|
| 5,748,841 A * | 5/1998 | Morin et al. | |
| 5,852,801 A * | 12/1998 | Hon et al. | |
| 5,963,894 A * | 10/1999 | Richardson et al. | 704/9 |
| 6,092,043 A * | 7/2000 | Squires et al. | 704/251 |
| 6,101,468 A * | 8/2000 | Gould et al. | 704/251 |
| 6,128,596 A * | 10/2000 | Mackie | 704/257 |
| 6,219,643 B1 * | 4/2001 | Cohen et al. | 704/257 |
| 6,233,560 B1 * | 5/2001 | Tannenbaum | 704/275 |
| 6,253,181 B1 * | 6/2001 | Junqua | |
| 6,272,455 B1 * | 8/2001 | Hoshen et al. | 704/1 |
| 6,272,462 B1 * | 8/2001 | Nguyen et al. | |
| 6,278,968 B1 * | 8/2001 | Franz et al. | |
| 6,314,398 B1 * | 11/2001 | Junqua et al. | 704/257 |
| 6,397,179 B1 * | 5/2002 | Crespo et al. | |
| 6,415,257 B1 * | 7/2002 | Junqua et al. | |
| 6,505,155 B1 * | 1/2003 | Vanbuskirk et al. | 704/246 |
| 6,567,778 B1 * | 5/2003 | Chao Chang et al. | 704/257 |
| 6,601,027 B1 * | 7/2003 | Wright et al. | 704/235 |
| 6,799,162 B1 * | 9/2004 | Goronzy et al. | |
| 6,879,956 B1 * | 4/2005 | Honda et al. | 704/244 |

FOREIGN PATENT DOCUMENTS

| | | | |
|---|---|---|---|
| EP | 1 011 094 | * | 6/2000 |
| WO | WO 98 13822 | * | 4/1998 |
| WO | WO 01 04874 | * | 1/2001 |

OTHER PUBLICATIONS

Fu Qiuliang et al., "Chinese word recognition and understanding with information feedback," 3rd International Conference on Signal Processing, 1996, Oct. 14-18, 1996, vol. 1, pp. 737 to 740.*

Fu Qiuliang et al., "A close ring structure of speech recognition and understanding," 1997 IEEE International Conference on Intelligent Processing Systems, Oct. 28-31, 1997, vol. 2, pp. 1769 to 1772.*

U. Bub, "Task adaptation for dialogues via telephone lines," fourth International Conference on Spoken Language, ICSLP 96, Oct. 3-6, 1996, vol. 2, pp. 825 to 828.*

Matsunaga et al., "Task adaptation in stochastic language models for continuous speech recognition," 1992 IEEE International Conference on Acoustics, Speech, and Signal Processing, Mar. 23-26, 1992, vol. 1, pp. 165 to 168.*

Masataki et al., "Task adaptation using MAP estimation in N-gram language modeling," 1997 IEEE International Conference on Acoustics, Speech, and Signal Processing, ICASSP-97, Apr. 21-24, 1997, vol. 2, pp. 783 to 786.*

* cited by examiner

FIG. 25

| 橋が： | は┐し└が | HA┐SHI└GA | (BRIDGE IS) |
| 端が： | は┐し　が | HA┐SHI　GA | (EDGE IS) |
| 箸が： | ┌は┐し　が | ┌HA┐SHI　GA | (CHOPSTICKS ARE) |

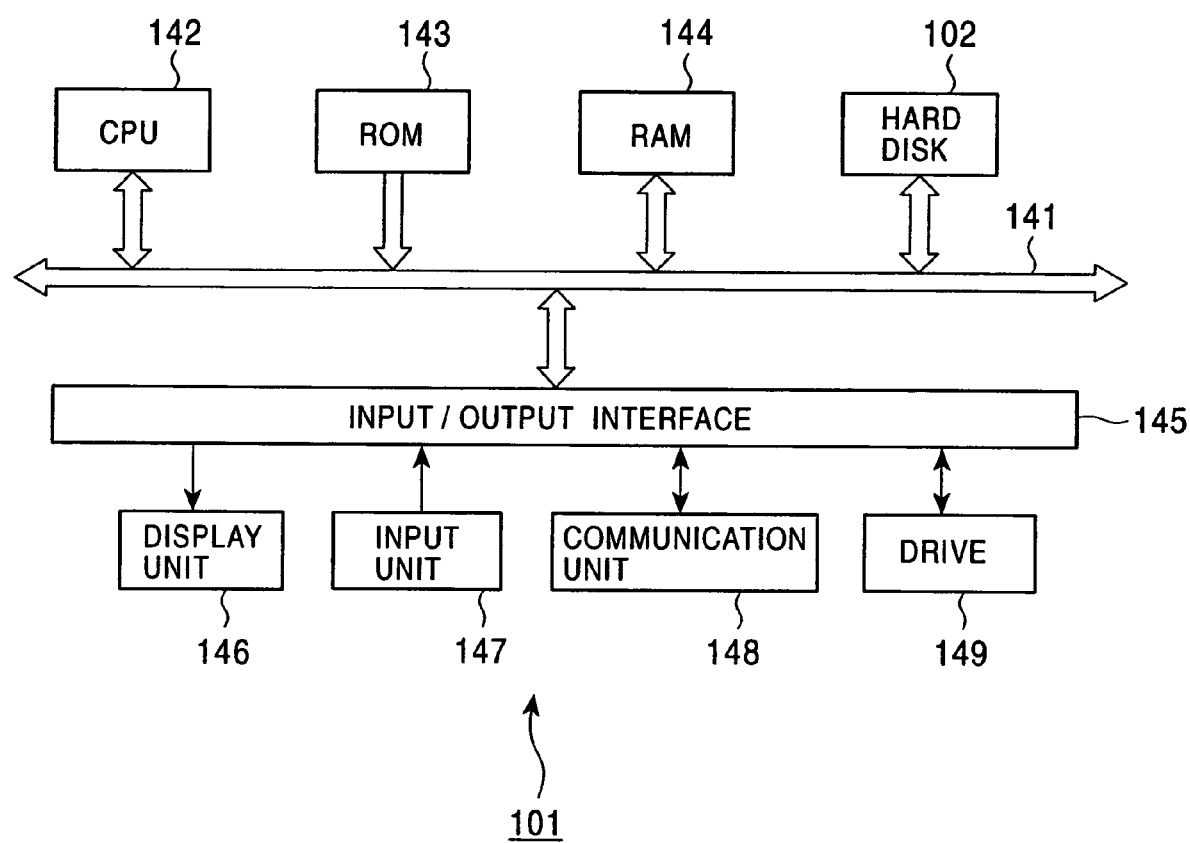

SPEECH RECOGNITION WITH FEEDBACK FROM NATURAL LANGUAGE PROCESSING FOR ADAPTATION OF ACOUSTIC MODEL

CROSS-REFERENCE TO RELATED APPLICATIONS

This application is a continuation of U.S. patent application Ser. No. 09/676,644, entitled "SPEECH RECOGNITION WITH FEEDBACK FROM NATURAL LANGUAGE PROCESSING FOR ADAPTATION OF ACOUSTIC MODELS," filed Sep. 29, 2000 now U.S. Pat. No. 6,879,956. Benefit of priority of the filing date of Sep. 29, 2000 is hereby claimed.

BACKGROUND OF THE INVENTION

1. Field of the Invention

The present invention relates to speech processing apparatuses, speech processing methods, and recording media for speech processing. More particularly, the invention relates to a speech processing apparatus and a speech processing method for performing easy and highly precise adaptation of models used for speech recognition. The invention also relates to a recording medium for storing a program implementing the above-described method.

2. Description of the Related Art

One of the known speech recognition algorithms is the Hidden Markov Model (HMM) method for recognizing input speech by using models. More specifically, in the HMM method, models (HMMs) defined by a transition probability (the probability of a transition from one state to another state) and an output probability (the probability of a certain symbol being output upon the occurrence of the transition of the state) are predetermined by learning, and then, the input speech is recognized by using the models.

In performing speech recognition, on-line adaptation processing is known in which the models are sequentially adapted by using the input speech in order to improve the recognition accuracy. According to this on-line adaptation processing, the precision of acoustic models is progressively enhanced and the task of language models is progressively adapted according to the amount of speech input by the speaker. Thus, this processing is an effective means for improving the recognition accuracy.

Methods for adapting the models are largely divided into two types: one type is "supervised learning" in which this method is implemented by providing a correct answer from a supervisor, and the other type is "unsupervised learning" in which this method is implemented by providing data which may be a correct answer (i.e., it is not certain that the data is actually correct) from a supervisor.

One conventional "unsupervised learning" method is the one disclosed in, for example, Japanese Unexamined Patent Application Publication No. 11-85184, in which adaptation of models is performed on input speech by using the speech recognition result as a supervisor in a speech recognition apparatus. In a conventional "unsupervised learning" method, such as the one disclosed in the above-described publication, it is not checked with the user whether the speech recognition result is correct. Thus, in this method, there is less burden on the user, but on the other hand, the reliability of the data used as a supervisor is not high enough, whereby the models may not be sufficiently adapted for the speaker.

One conventional "supervised learning" method is the one discussed in, for example, Q. Huo et al., A study of on-line Quasi-Bayes adaptation for DCHMM-based speech recognition, Proceedings of the International Conference on Acoustics, Speech and Signal Processing 1996, pp. 705–708. In a speech recognition apparatus, the user is requested to issue a certain amount of speech, and the models are adapted by using the speech. Alternatively, in a speech recognition apparatus, the user is requested to check whether the speech recognition result is correct, and the models are adapted by using the result which was determined to be correct.

However, the above-described model adaptation method implemented by requiring a certain amount of speech is not suitable for on-line adaptation. The model adaptation method performed on input speech by using the speech recognition result as a supervisor in a speech recognition apparatus. In a conventional "unsupervised learning" method, such as the one disclosed in the above-described publication, it is not checked with the user whether the speech recognition result is correct. Thus, in this method, there is less burden on the user, but on the other hand, the reliability of the data used as a supervisor is not high enough, whereby the models may not be sufficiently adapted for the speaker.

One conventional "supervised learning" method is the one discussed in, for example, Q. Huo et al., A study of on-line Quasi-Bayes adaptation for DCHMM-based speech recognition, Proceedings of the International Conference on Acoustics, Speech and Signal Processing 1996, pp. 705–708. In a speech recognition apparatus, the user is requested to issue a certain amount of speech, and the models are adapted by using the speech. Alternatively, in a speech recognition apparatus, the user is requested to check whether the speech recognition result is correct, and the models are adapted by using the result which was determined to be correct.

However, the above-described model adaptation method implemented by requiring a certain amount of speech is not suitable for on-line adaptation. The model adaptation method implemented by requesting the user to check the speech recognition result imposes a heavy burden on the user.

Another method for adapting models is the one disclosed in, for example, Japanese Unexamined Patent Application Publication No. 10-198395, in which language models or data for creating language models are prepared according to tasks, such as according to specific fields or topics, and different tasks of language models are combined to create a high-precision task-adapted language model off-lines. In order to perform on-line adaptation by employing this method, however, it is necessary to infer the type of task of the speech, which makes it difficult to perform adaptation by the single use of a speech recognition apparatus.

SUMMARY OF THE INVENTION

Accordingly, in view of the above background, it is an object of the present invention to achieve high-precision adaptation of models used for speech recognition without imposing a burden on a user.

In order to achieve the above object, according to one aspect of the present invention, there is provided a speech processing apparatus including a speech recognition unit for performing speech recognition, and a natural-language processing unit for performing natural language processing on a speech recognition result obtained from the speech recognition unit. The natural-language processing unit includes a feedback device for feeding back information obtained as a result of the natural language processing performed on the speech recognition result to the speech recognition unit. The speech recognition unit includes a processor for performing processing based on the information fed back from the feedback device.

The speech recognition unit may perform speech recognition by using models, and the processor may perform adaptation of the models based on the information fed back from the feedback device.

The feedback device may feed back at least one of speech recognition result zones which are to be used for the adaptation of the models and speech recognition result zones which are not to be used for the adaptation of the models. Alternatively, the feedback device may feed back the speech recognition result which appears to be correct. Or, the feedback device may feed back the reliability of the speech recognition result. Alternatively, the feedback device may feed back a task of the speech recognition result.

The feedback device may feed back at least one of speech recognition result zones which are to be used for the adaptation of the models, speech recognition result zones which are not to be used for the adaptation of the models, the speech recognition result which appears to be correct, the reliability of the speech recognition result, and a task of the speech recognition result.

According to another aspect of the present invention, there is provided a speech processing method including a speech recognition step of performing speech recognition, and a natural-language processing step of performing natural language processing on a speech recognition result obtained in the speech recognition step. The natural-language processing step includes a feedback step of feeding back information obtained as a result of the natural language processing performed on the speech recognition result to the speech recognition step. The speech recognition step includes a process step of performing processing based on the information fed back from the feedback step.

According to still another aspect of the present invention, there is provided a recording medium for recording a program which causes a computer to perform speech recognition processing. The program includes a speech recognition step of performing speech recognition, and a natural-language processing step of performing natural language processing on a speech recognition result obtained in the speech recognition step. The natural-language processing step includes a feedback step of feeding back information obtained as a result of the natural language processing performed on the speech recognition result to the speech recognition step. The speech recognition step includes a process step of performing processing based on the information fed back from the feedback step.

Thus, according to the speech processing apparatus, the speech processing method, and the recording medium of the present invention, information obtained as a result of natural language processing performed on a speech recognition result is fed back, and processing is performed based on the fed back information. It is thus possible to perform adaptation of the models used for speech recognition with high precision without imposing a burden on the user.

BRIEF DESCRIPTION OF THE DRAWINGS

FIG. 25 illustrates the accents of three Japanese words;

FIG. 31 is a block diagram illustrating an example of the configuration of a computer 101 shown in FIG. 30.

DESCRIPTION OF THE PREFERRED EMBODIMENTS

The present invention is discussed more fully below with reference to the accompanying drawings through illustration of a preferred embodiment.

Figure 1:
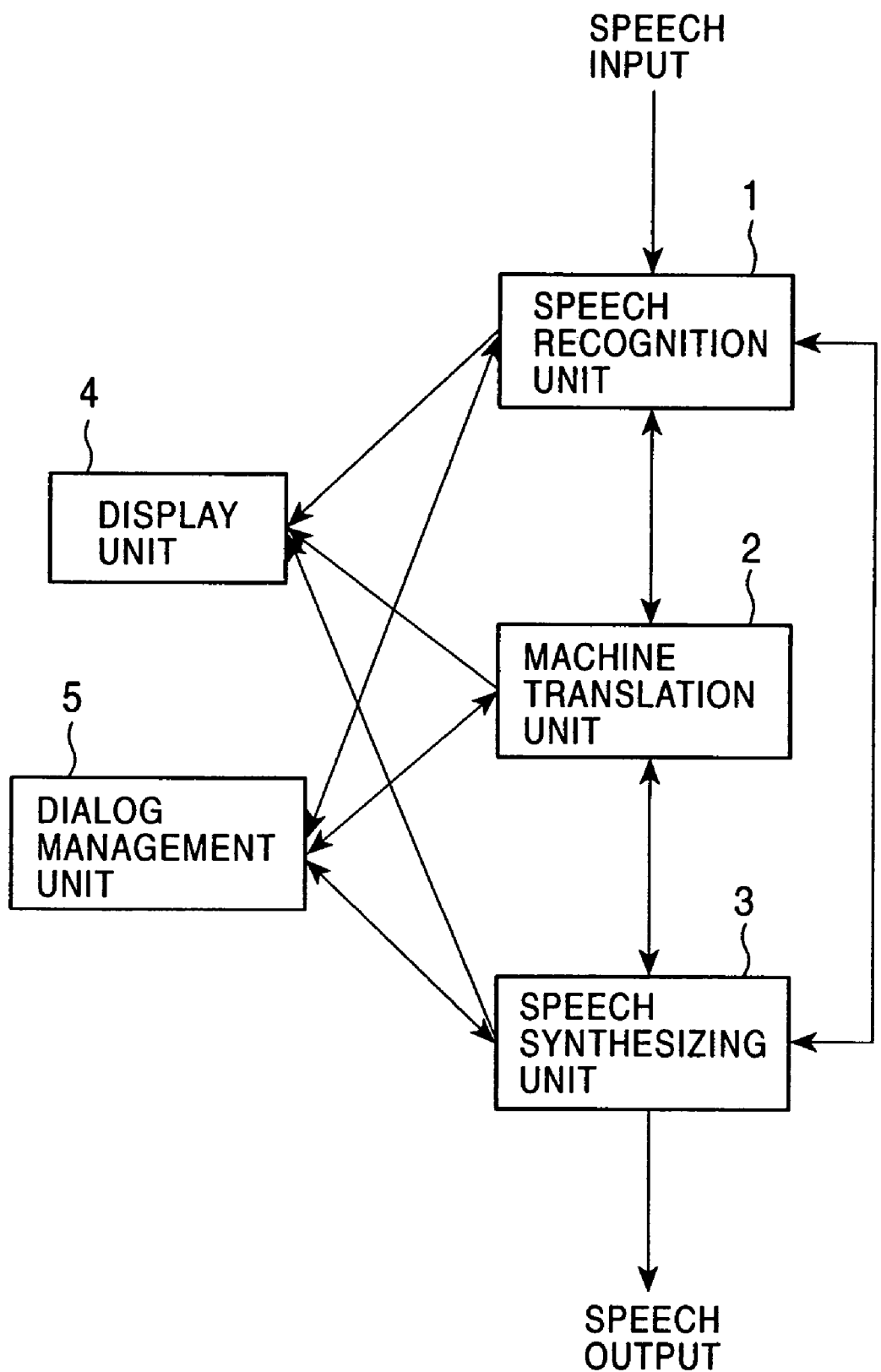
FIG. 1 is a block diagram illustrating an example of the configuration of a speech processing system incorporating the present invention.

FIG. 1 illustrates the configuration of a speech processing system (system designates a logical collection of a plurality of apparatuses, and it is not essential that the individual apparatuses be within the same casing) incorporating the present invention.

In this speech processing system, speech is input, and a reply is output accordingly. A translation of the speech is also output. Additionally, a reply may also be translated into a language other than the language used for the input speech, and the translated reply is then output.

More specifically, speech, such as Japanese speech, is input, into a speech recognition unit 1. The speech recognition unit 1 then recognizes the input speech, and outputs text and other associated information to a machine translation unit 2, a display unit 4, a dialog management unit 5, etc. as a speech recognition result.

The machine translation unit 2 analyzes the speech recognition result output from the speech recognition unit 1 so as to machine-translate the input speech into a language other than the language used for the input speech, for example, into English, and outputs text and associated information to a speech synthesizing unit 3, the display unit 4, the dialog management unit 5, and so on, as a translation result. The speech synthesizing unit 3 then performs speech synthesis based on the outputs of the machine translation unit 2 and the dialog management unit 5, and then outputs the synthesized speech as a reply to the input speech or as a translation result of the input speech.

The display unit 4, which is formed of, for example, a liquid crystal display, displays the speech recognition result obtained from the speech recognition unit 1, the machine translation result obtained from the machine translation unit 2, the reply created by the dialog management unit 5, etc.

The dialog management unit 5 creates a reply to the speech recognition result obtained from the speech recognition unit 1, and outputs it to the machine translation unit 2, the speech synthesizing unit 3, the display unit 4, the dialog management unit 5, and so on. The dialog management unit 5 also forms a reply to the machine translation result obtained from the machine translation unit 2, and outputs it to the speech synthesizing unit 3 and the display unit 4.

In the above-configured speech processing system, to output a reply to input speech, the input speech is first recognized in the speech recognition unit 1, and is output to the dialog management unit 5. The dialog management unit 5 forms a reply to the speech recognition result and supplies it to the speech synthesizing unit 3. The speech synthesizing unit 3 then creates a synthesized speech corresponding to the reply formed by the dialog management unit 5.

In outputting a translation of the input speech, the input speech is first recognized in the speech recognition unit 1, and is supplied to the machine translation unit 2. The machine translation unit 2 machine-translates the speech recognition result and supplies it to the speech synthesizing unit 3. The speech synthesizing unit 3 then creates a synthesized speech in response to the translation result obtained from the machine translation unit 2 and outputs it.

In translating a reply to the input speech into another language and outputting it, the input speech is first recognized in the speech recognition unit 1 and is output to the dialog management unit 5. The dialog management unit 5 then forms a reply to the speech recognition result from the speech recognition unit 1, and supplies it to the machine translation unit 2. The machine translation unit 2 then machine-translates the reply and supplies it to the speech synthesizing unit 3. The speech synthesizing unit 3 forms a synthesized speech in response to the translation result from the machine translation unit 2 and outputs it.

In the above-described case, namely, in translating a reply to the input speech into another language and outputting it, the speech recognition result from the speech recognition unit 1 may first be machine-translated in the machine translation unit 2, and then, a reply to the translation result may be created in the dialog management unit 5. Subsequently, a synthesized speech corresponding to the reply may be formed in the speech synthesizing unit 3 and output.

Figure 2:
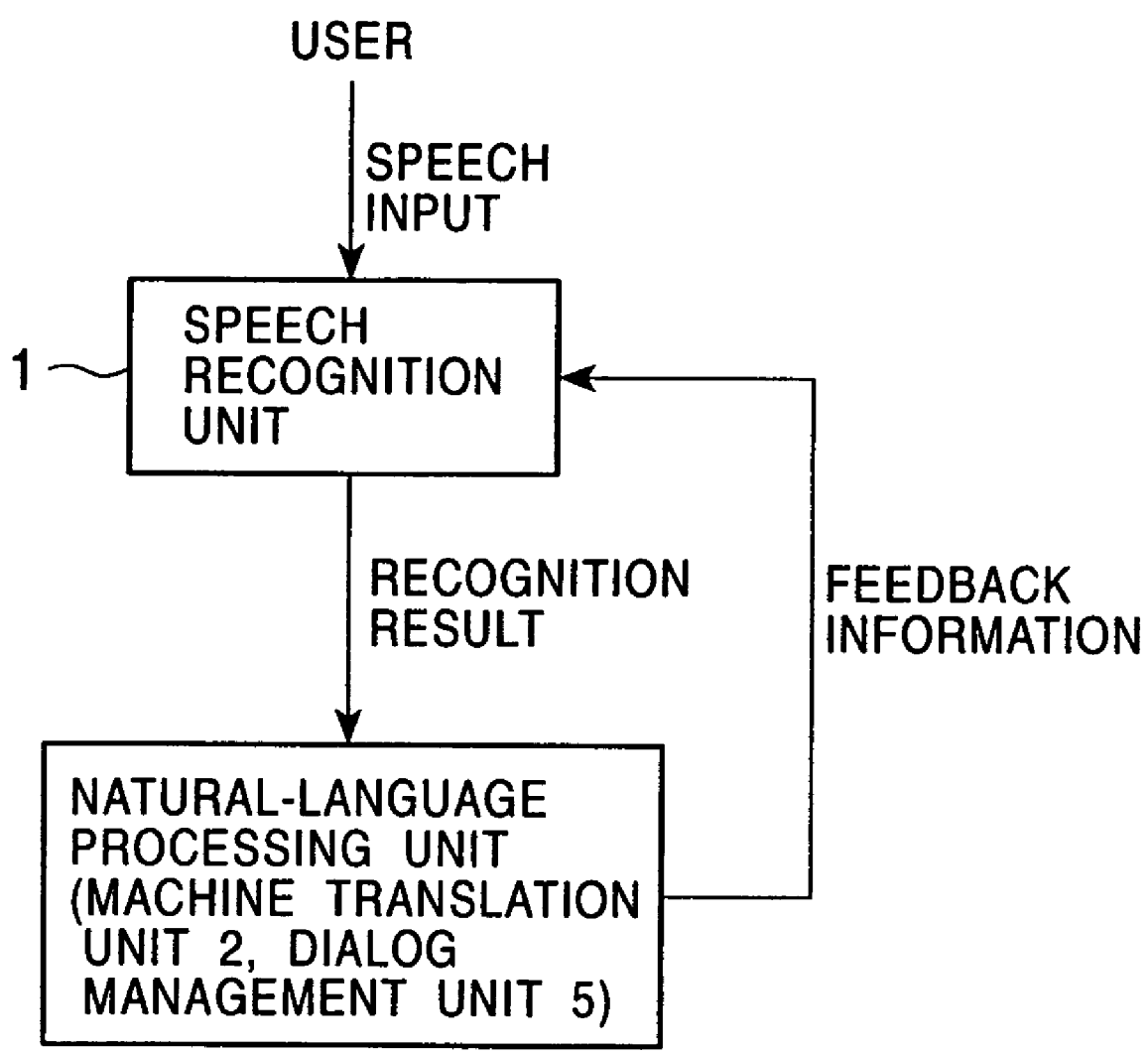
FIG. 2 illustrates an overview of the operation performed by the speech processing system shown in FIG. 1.

In the speech processing system shown in FIG. 1, a user's speech (input speech) is recognized in the speech recognition unit 1, as shown in FIG. 2, and the speech recognition result is processed in the machine translation unit 2 and the dialog management unit 5, which together serve as a natural-language processing unit for performing natural language processing, such as machine translation and dialog management. In this case, the machine translation unit 2 and the dialog management unit 5 feed back to the speech recognition unit 1 the information obtained as a result of the natural language processing performed on the speech recognition result. The speech recognition unit 1 then executes various types of processing based on the information which is fed back as discussed above (hereinafter sometimes referred to as "feedback information").

More specifically, the machine translation unit 2 and the dialog management unit 5 feed back useful information for adapting models used in the speech recognition unit 1, and the speech recognition unit 1 performs model adaptation based on the useful information. Also, for facilitating the execution of the natural language processing on the speech recognition result by the speech recognition unit 1, the machine translation unit 2 and the dialog management unit 5 feed back, for example, information for altering the units of speech recognition results, and the speech recognition unit 1 then alters the unit of speech based on the above information. Additionally, the machine translation unit 2 and the dialog management unit 5 feed back, for example, information for correcting errors of the speech recognition result made by the speech recognition unit 1, and the speech recognition unit 1 performs suitable processing for obtaining a correct speech recognition result.

Figure 3:
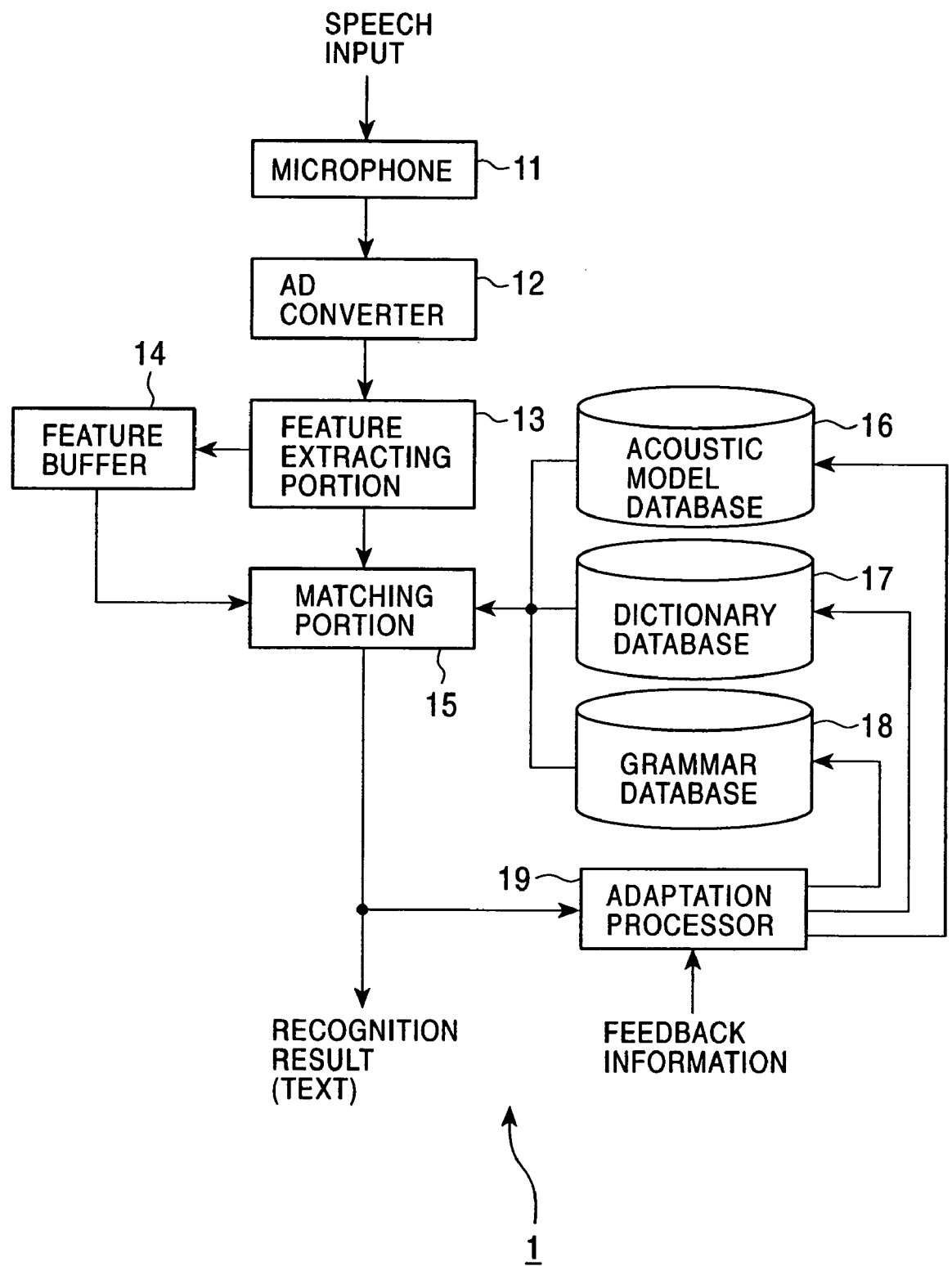
FIG. 3 is a block diagram illustrating a first example of the configuration of a speech recognition unit 1.

FIG. 3 illustrates a first example of the configuration of the speech recognition unit 1 shown in FIG. 1.

Speech from the user is input into a microphone 11 in which the speech is converted into an audio signal as an electric signal. The audio signal is then supplied to an analog-to-digital (AD) converter 12. After sampling and quantizing the analog audio signal from the microphone 11, the AD converter 12 converts it into a digital audio signal. The digital audio signal is then supplied to a feature extracting portion 13.

The feature extracting portion 13 extracts, from the audio data from the AD converter 12, feature parameters, for example, the spectrum, linear prediction coefficient, cepstrum coefficient, and line spectrum pair, of each frame, and supplies them to a feature buffer 14 and a matching portion 15. The feature buffer 14 temporarily stores the feature parameters supplied from the feature extracting portion 13.

The matching portion 15 recognizes the speech input into the microphone 11, based on the feature parameters from the feature extracting portion 13 and the feature parameters stored in the feature buffer 14, while referring to an acoustic model database 16, a dictionary database 17, and a grammar database 18 as required.

More specifically, the acoustic model database 16 stores acoustic models representing the acoustic features, such as the individual phonemes and syllables, of the language corresponding to the speech to be recognized. As the acoustic models, HMM models may be used. The dictionary database 17 stores a word dictionary indicating the pronunciation models of the words to be recognized. The grammar database 18 stores grammar rules representing the collocation (concatenation) of the individual words registered in the word dictionary of the dictionary database 17. The grammar rules may include rules based on the context-free grammar (CFG) and the statistical word concatenation probability (N-gram).

The matching portion 15 connects acoustic models stored in the acoustic model database 16 by referring to the word dictionary of the dictionary database 17, thereby forming the acoustic models (word models) of the words. The matching portion 15 then connects some word models by referring to the grammar rules stored in the grammar database 18, and by using such connected word models, recognizes the speech input into the microphone 11 based on the feature parameters according to, for example, the HMM method.

Then, the speech recognition result obtained by the matching portion 15 is output in, for example, text format.

Meanwhile, an adaptation processor 19 receives the speech recognition result from the matching portion 15. Upon receiving the above-described feedback information, which is discussed more fully below, from the dialog management unit 5, the adaptation processor 19 extracts, from the speech recognition result, models suitable for adapting the acoustic models in the acoustic model database 16 and the language models in the dictionary database 17 based on the feedback information. By using the speech recognition result as a supervisor for performing precise adaptation, on-line adaptation is performed on the acoustic models in the acoustic model database 16 and the language models in the dictionary database 17 (hereinafter both models are simply referred to as "models").

It is now assumed that the HMMs are used as the acoustic models. In this case, the adaptation processor 19 performs model adaptation by altering the parameters, such as the average value and the variance, which define the transition probability or the output probability representing the HMM, by the use of the speech recognition result.

Figure 4:
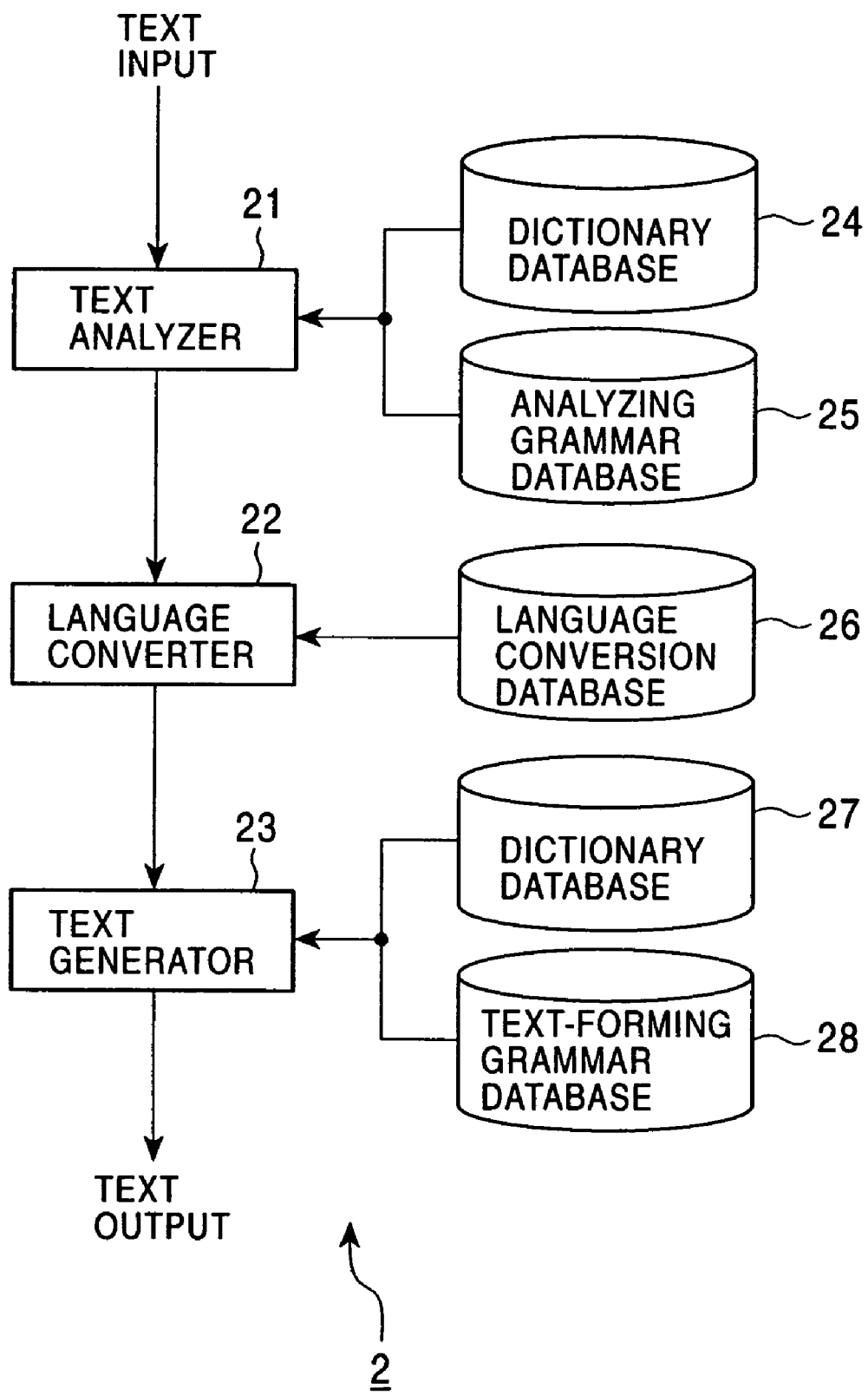
FIG. 4 is a block diagram illustrating a first example of the configuration of a machine translation unit 2.

FIG. 4 illustrates a first example of the configuration of the machine translation unit 2 shown in FIG. 1.

Text as the speech recognition result output from the speech recognition unit 1 and text as a reply output from the dialog management unit 5 are input into a text analyzer 21. The text analyzer 21 then analyzes the text while referring to a dictionary database 24 and an analyzing grammar database 25.

More specifically, the dictionary database 24 stores a word dictionary designating the notation of the individual words, the word-class information, etc., required for the application of the analyzing grammar. The analyzing grammar database 25 stores analyzing grammar rules designating the restrictions concerning the word concatenation, etc. based on the information on the individual words of the word dictionary. The text analyzer 21 conducts morpheme analyses and syntax analyses on the input text based on the word dictionary and the analyzing grammar rules, thereby extracting language information of, for example, words and syntax, forming the input text. The analyzing techniques employed by the text analyzer 21 may include techniques using regular grammar, the context-free grammar (CFG), and the statistical word concatenation probability.

The language information obtained in the text analyzer 21 as an analysis result of the input text is supplied to a language converter 22. The language converter 22 converts the language information of the input text into that of a translated language by referring to a language conversion database 26.

That is, the language conversion database 26 stores language conversion data, such as conversion patterns (templates) from language information of an input language (i.e., the language input into the language converter 22) into that of an output language (i.e., the language output from the language converter 22), examples of translations between an input language and an output language, and thesauruses used for calculating the similarities between the input language and the translation examples. Based on such language conversion data, the language converter 22 converts the language information of the input text into that of an output language.

The language information of the output language acquired in the language converter 22 is supplied to a text generator 23. The text generator 23 then forms text of the translated output language based on the corresponding language information by referring to a dictionary database 27 and a text-forming grammar database 28.

That is, the dictionary database 27 stores a word dictionary describing the word classes and the word inflections required for forming output language sentences. The text-forming grammar database 28 stores inflection rules of the required words and text-forming grammar rules, such as restrictions concerning the word order. Then, the text generator 23 converts the language information from the language converter 22 into text based on the word dictionary and the text-forming grammar rules, and outputs it.

Figure 5:
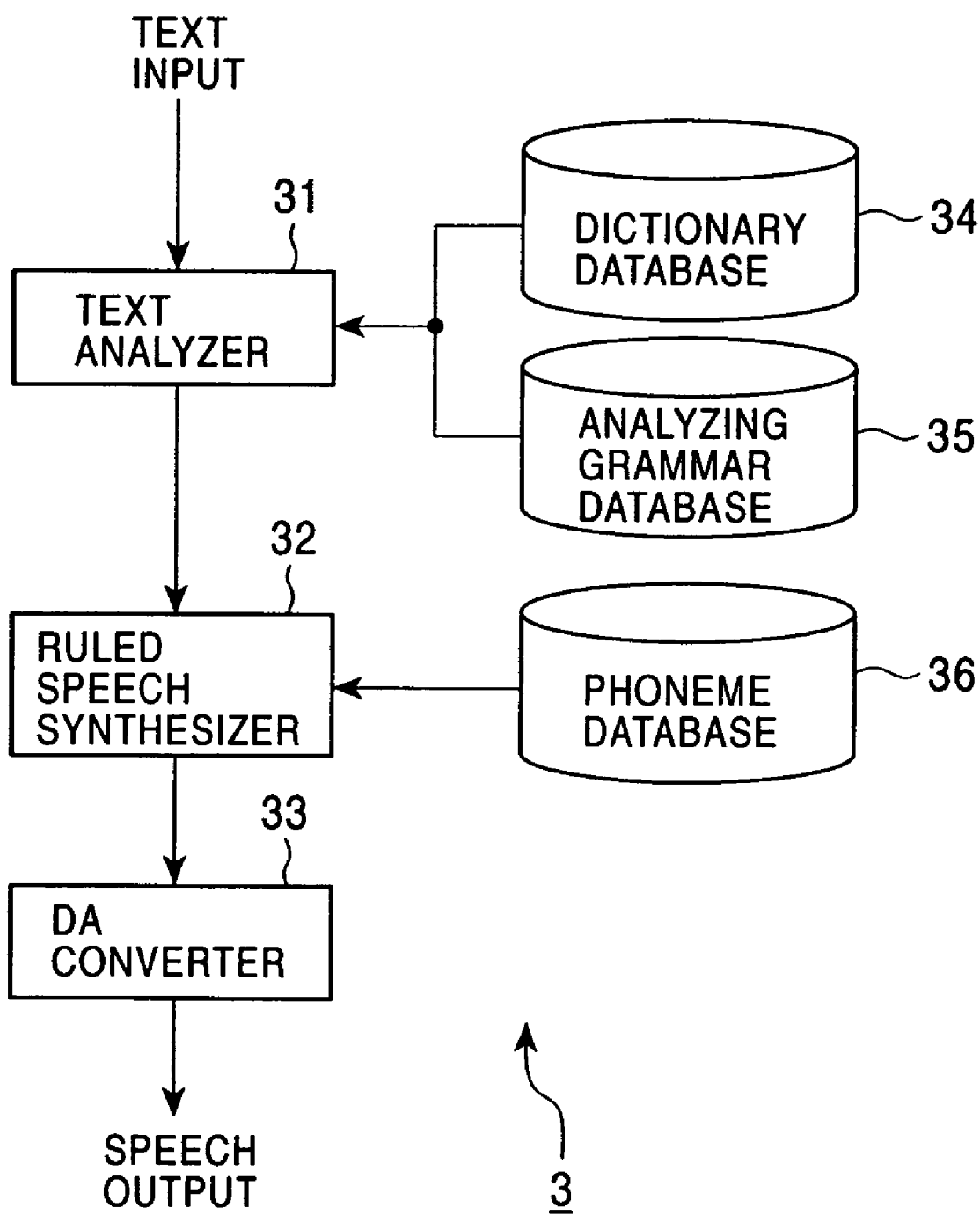
FIG. 5 is a block diagram illustrating an example of the configuration of a speech synthesizing unit 3.

FIG. 5 illustrates an example of the configuration of the speech synthesizing unit 3 shown in FIG. 1.

Text as a translation result output from the machine translation unit 2 and text as a reply output from the dialog management unit 5 are input into a text analyzer 31. The text analyzer 31 analyzes the input text while referring to a dictionary database 34 and an analyzing grammar database 35.

More specifically, the dictionary database 34 stores a word dictionary describing the word class information and the phonetic and accent information of the individual words. The analyzing grammar database 35 stores analyzing grammar rules, such as restrictions on the word concatenation, concerning the words entered in the word dictionary of the dictionary database 34. The text analyzer 31 then conducts morpheme analyses and syntax analyses on the input text based on the word dictionary and the analyzing grammar rules so as to extract information required for ruled speech-synthesizing, which is to be performed in a ruled speech synthesizer 32. The information required for ruled speech-synthesizing may include information for controlling the positions of pauses, the accent and intonation, prosodic information, and phonemic information, such as the pronunciation of the words.

The information obtained from the text analyzer 31 is supplied to the ruled speech synthesizer 32. The ruled speech synthesizer 32 generates audio data (digital data) of a synthesized speech corresponding to the text input into the text analyzer 31 by referring to a phoneme database 36.

The phoneme database 36 stores phoneme data in the form of, for example, CV (Consonant, Vowel), VCV, or CVC. The ruled speech synthesizer 32 connects required phoneme data based on the information from the text analyzer 31, and also appends pauses, accents, and intonation, as required, to the connected phonemes, thereby generating audio data of a synthesized speech corresponding to the text input into the text analyzer 31.

The audio data is then supplied to a DA converter 33 in which it is converted into an analog audio signal. The analog audio signal is then supplied to a speaker (not shown), so that the corresponding synthesized speech is output from the speaker.

Figure 6:
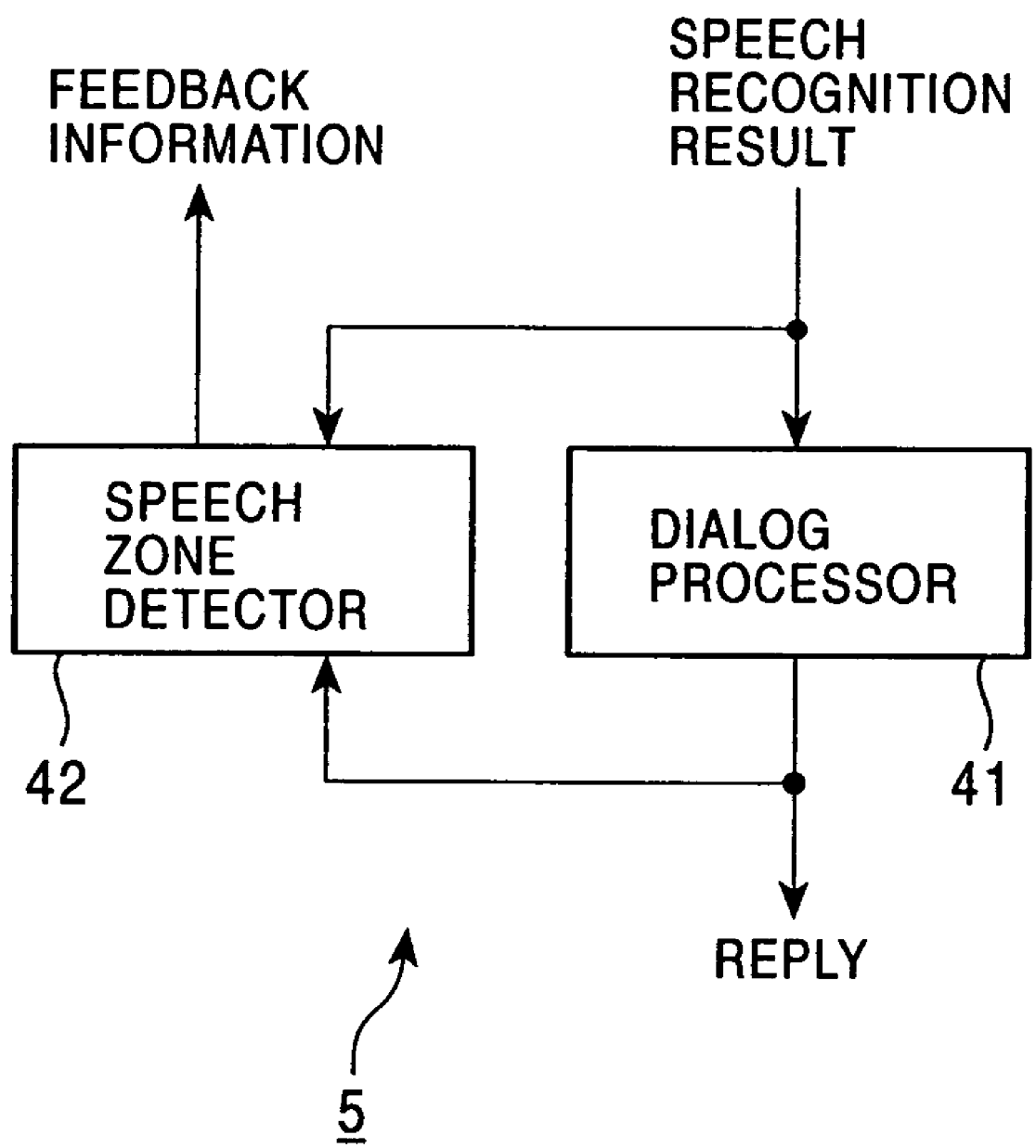
FIG. 6 is a block diagram illustrating a first example of the configuration of a dialog management unit 5.

FIG. 6 illustrates a first example of the configuration of the dialog management unit 5 shown in FIG. 1.

The speech recognition result obtained from the speech recognition unit 1 is supplied to a dialog processor 41 and a speech zone detector 42. The dialog processor 41 creates a reply to the speech recognition result and outputs it. Meanwhile, the speech zone detector 42 monitors a reply to be output from the dialog processor 41. Based on this reply, the speech zone detector 42 detects the zones to be used for adapting the models (hereinafter sometimes referred to as "adaptation zones") from the speech recognition result, and feeds back the adaptation zones to the adaptation processor 19 of the speech recognition unit 1 as the feedback information.

Alternatively, speech recognition zones which are not to be used for adapting the models may be fed back to the speech recognition unit 1 as the feedback information. Or, both the speech recognition zones which are to be used for model adaptation and those which are not to be used therefor may be fed back.

Figure 7:
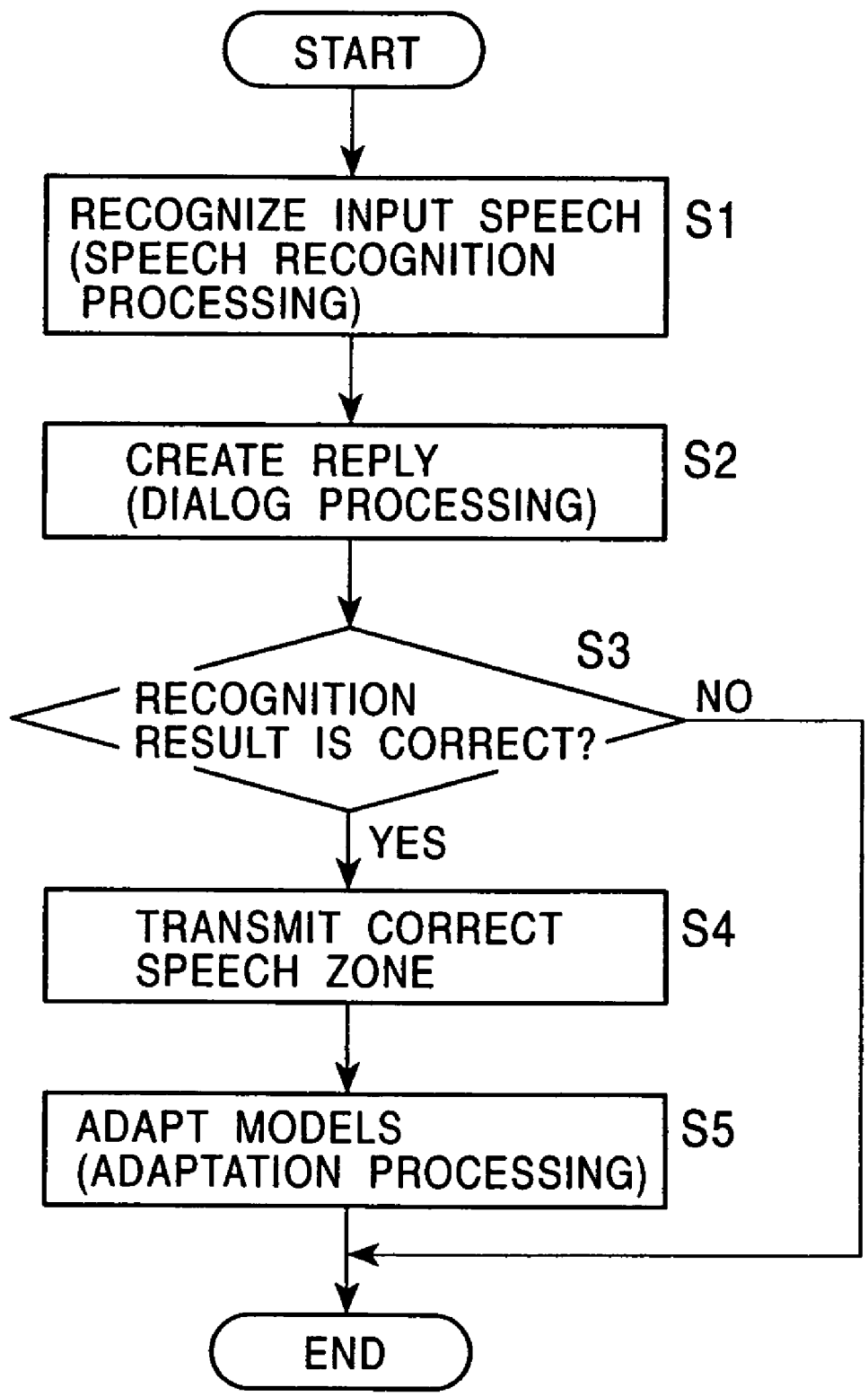
FIG. 7 is a flow chart illustrating a first example of the operation of the speech processing system.

A description is now given, with reference to the flow chart of FIG. 7, of the operation of the speech processing system which is provided with the speech recognition unit 1 such as the one shown in FIG. 3 and the dialog management unit 5 such as the one shown in FIG. 6.

The user issues speech and the corresponding speech is input into the speech recognition unit 1. Then, in step S1, the speech recognition unit 1 recognizes the input speech and outputs the resulting text to, for example, the dialog management unit 5 as the speech recognition result.

In step S2, the dialog processor 41 of the dialog management unit 5 creates a reply to the speech recognition result output from the speech recognition unit 1 and outputs the reply. Subsequently, in step S3, the speech zone detector 42 determines from the reply from the dialog processor 41 whether the speech recognition result is correct. If the outcome of step S3 is no, steps S4 and S5 are skipped, and the processing is completed.

On the other hand, if it is determined in step S3 that the speech recognition result is correct, the process proceeds to step S4 in which the speech zone detector 42 detects correct zones from the speech recognition result, and transmits them to the adaptation processor 19 of the speech recognition unit 1 (FIG. 3) as adaptation zones.

Then, in step S5, in the adaptation processor 19, by using only the adaptation zones output from the speech zone detector 42 among the speech recognition result output from the matching portion 15, adaptation of the models is conducted, and the processing is then completed.

According to the aforementioned processing, the models used for speech recognition can be precisely adapted without imposing a burden on the user.

More specifically, it is now assumed, for example, that the following dialog concerning the purchase of a concert ticket may be made between the speech processing system shown in FIG. 1 and the user.

User: "Hello. I'd like to have one ticket for the Berlin Philharmonic Orchestra on September 11." (1)

Reply: "One ticket for the Berlin Philharmonic Orchestra on September 11? Tickets are available for S to D seats. Which one would you like?" (2)

User: "S, please." (3)

Reply: "A?" (4)

User: "No, S." (5)

Reply: "S. We will reserve the 24th seat on the fourth row downstairs. The price is 28,000 yen. Is that all right?" (6)

User: "Fine." (7)

Reply: "Thank you." (8)

In the dialog from (1) to (8), the speech zone detector 42 determines the speech recognition results of user's speech (1), (5), and (7) to be correct from the associated replies (2), (6), and (8), respectively. However, the speech recognition result of user's speech (3) is determined to be wrong since the user re-issues speech (5) to reply (4) which is made in response to speech (3).

In this case, the speech zone detector 42 feeds back the correct zones of the speech recognition results corresponding to user's speech (1), (5), and (7) to the adaptation processor 19 as the feedback information (the zone of the speech recognition result corresponding to user's speech (3) which was determined to be wrong is not fed back). As a result, by using only the above-mentioned speech recognition correct zones, i.e., by employing the correct speech recognition result as a supervisor and by using the user's speech corresponding to the correct speech recognition result as a learner, adaptation of the models is performed.

Accordingly, by the use of only correct recognition results, it is possible to achieve highly precise adaptation of the models (resulting in a higher recognition accuracy). Additionally, a burden is not imposed on the user.

Figure 8:
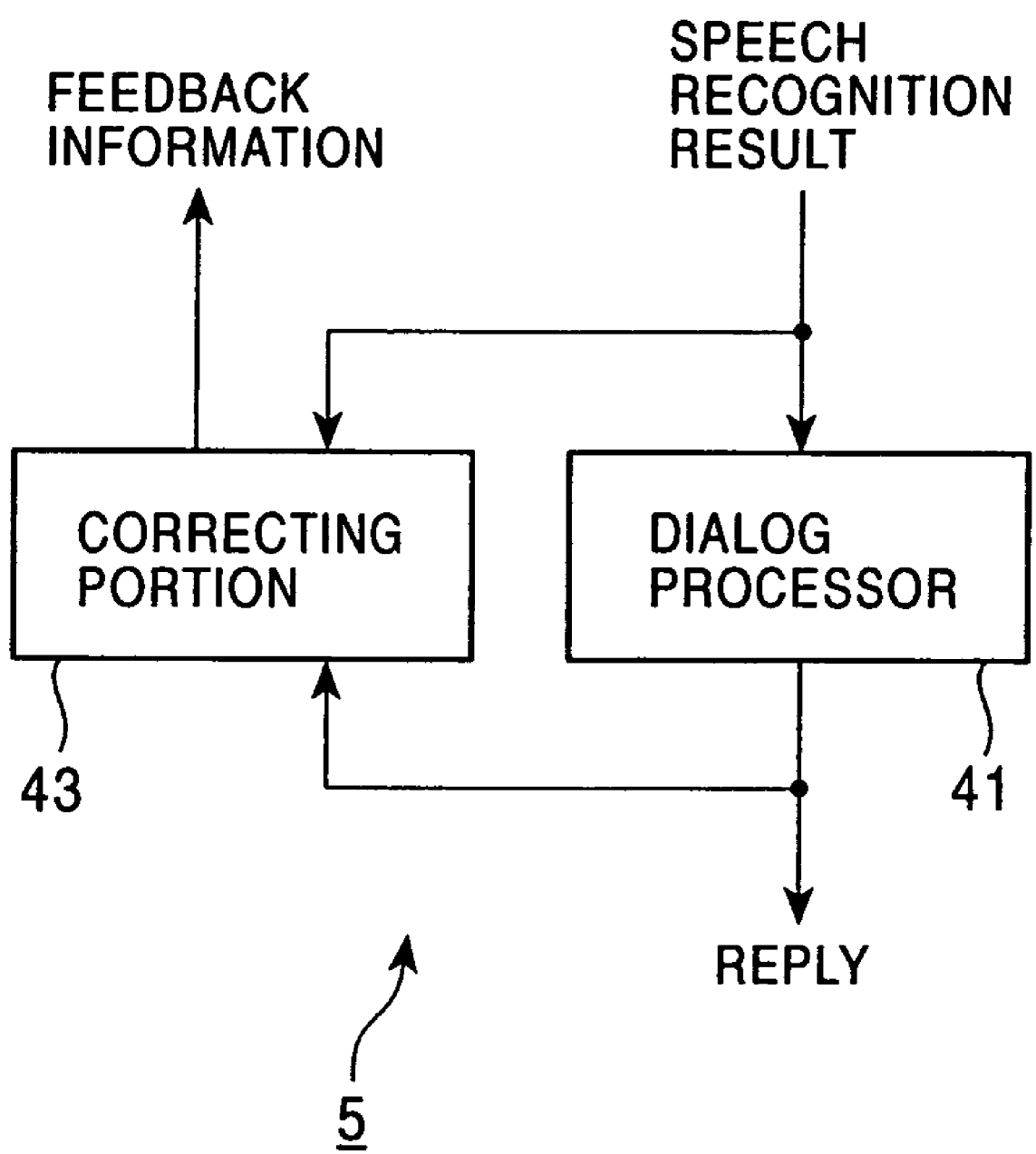
FIG. 8 is a block diagram illustrating a second example of the configuration of the dialog management unit 5.

FIG. 8 illustrates a second example of the configuration of the dialog management unit 5 shown in FIG. 1. The same elements as those shown in FIG. 6 are designated with like reference numerals. The dialog management unit 5 shown in FIG. 8 is configured similarly to the counterpart shown in FIG. 6, except that a correcting portion 43 is provided instead of the speech zone detector 42.

The correcting portion 43 monitors replies output from the dialog processor 41 and determines based on the replies whether the speech recognition results output from the speech recognition unit 1 are correct, and if so, the correcting portion 43 feeds back the speech recognition results to the adaptation processor 19 as the feedback information. If the speech recognition results are found to be wrong, the correcting portion 43 corrects (or modifies) the results and feeds them back to the adaptation processor 19 as the feedback information.

Figure 9:
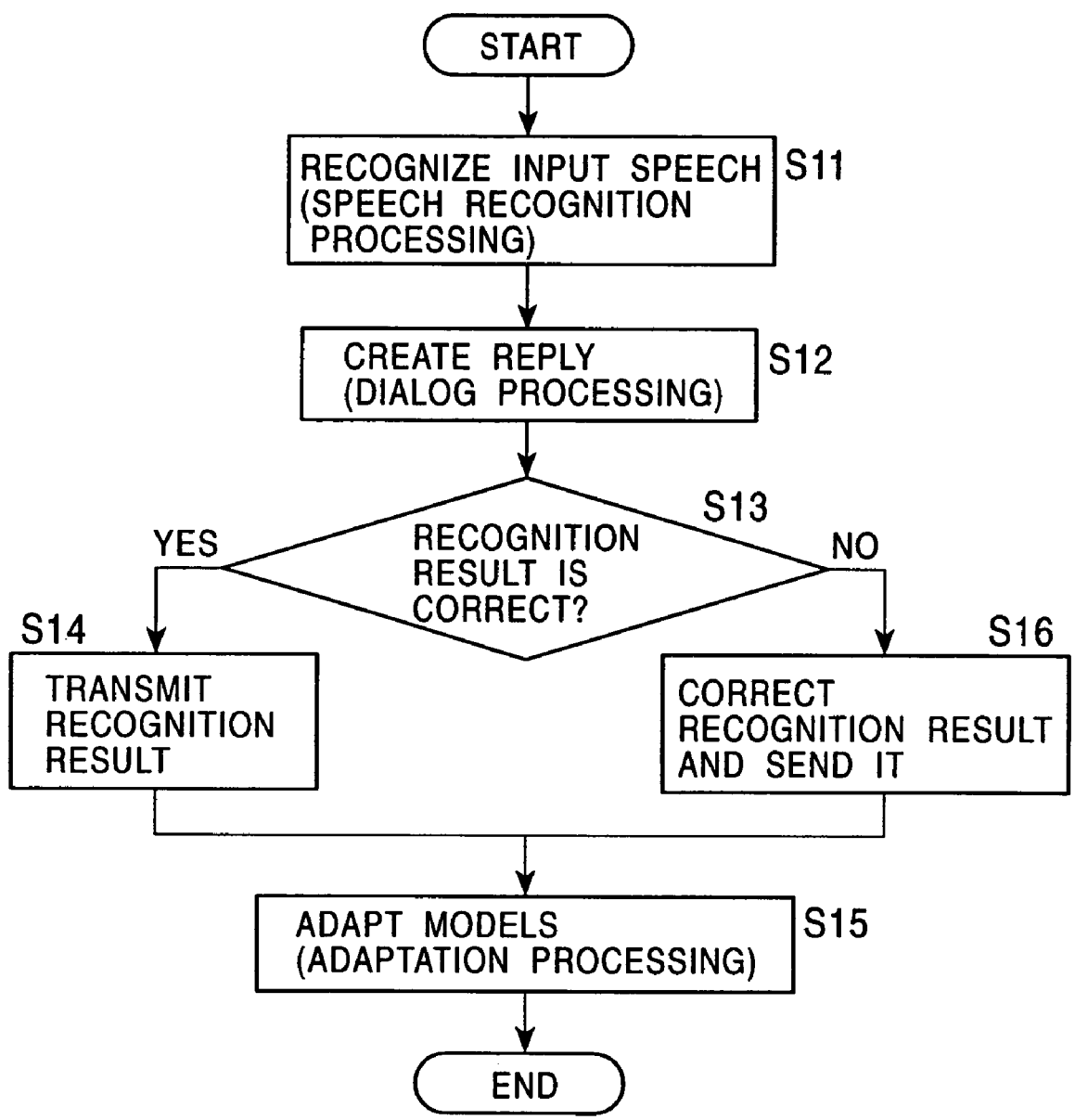
FIG. 9 is a flow chart illustrating a second example of the operation of the speech processing system.

A description is now given, with reference to the flow chart of FIG. 9, of the operation of the speech processing system shown in FIG. 1 which is provided with the speech recognition unit such as the one shown in FIG. 3 and the dialog management unit 5 such as the one shown in FIG. 8. In steps S11 and S12, processes similar to those of steps S1 and S2, respectively, of FIG. 7 are executed. Then, a reply to the speech recognition result from the speech recognition unit 1 is output from the dialog processor 41.

The process then proceeds to step S13 in which the correcting portion 43 determines from the reply from the dialog processor 41 whether the speech recognition result is correct. If the outcome of step S13 is yes, the process proceeds to step S14. In step S14, the correcting portion 43 transmits the correct speech recognition result to the adaptation processor 19 of the speech recognition unit 1 as the feedback information.

In step S15, the adaptation processor 19 performs adaptation of the models by using the correct speech recognition result from the correcting portion 43 as the feedback information. The processing is then completed.

On the other hand, if it is found in step S13 that the speech recognition result from the speech recognition unit is wrong, the flow proceeds to step S16. In step S16, the correcting portion 43 corrects (modifies) the speech recognition result based on the reply from the dialog processor 41, and sends the corrected (modified) result to the adaptation processor 19 as the feedback information.

In step S15, the adaptation processor 19 conducts adaptation of the models by using the corrected (modified) speech recognition result from the correcting portion 43. The processing is then completed.

According to the above-described processing, as well as the previous processing, models used for speech recognition can be adapted with high precision without burdening the user.

It is now assumed, for example, that the aforementioned dialog from (1) to (8) is made between the speech processing system shown in FIG. 1 and the user. Then, the correcting portion 43 determines that the speech recognition results of user's speech (1), (5), and (7) are correct from the associated replies (2), (6), and (8), respectively. In contrast, the correcting portion 43 determines that the speech recognition result of user's speech (3) is wrong since the user re-issues speech (5) in response to reply (4).

In this case, the correcting portion 43 feeds back the correct speech recognition results of user's speech (1), (5), and (7) to the adaptation processor 19 as the feedback information. The adaptation processor 19 then performs adaptation of the models by using the correct speech recognition results and the associated user's speech (1), (5), and (7).

The correcting portion 43 also corrects for the wrong speech recognition result of user's speech (3) based on the correct recognition result of user's subsequent speech (5). More specifically, the correcting portion 43 makes the following analyses on reply "A?" (4) to user's speech "S, please." (3): "S" has been wrongly recognized as "A" in (3) since user's subsequent speech (5) "No, S." has been correctly recognized, and thus, the correct recognition result should be "S" in user's speech (3). Accordingly, as a result of the above-described analyses, the correcting portion 43 corrects the speech recognition result which was wrongly recognized as "A" rather than "S", and feeds back the corrected result to the adaptation processor 19 as the feedback information. In this case, the adaptation processor 19 performs adaptation of the models by using the corrected speech recognition result and the corresponding user's speech (3).

Thus, even if speech is wrongly recognized, a wrong recognition result can be corrected (modified), and adaptation of the models is performed based on the corrected (modified) result. As a consequence, models can be precisely adapted without burdening the user, resulting in a higher recognition accuracy.

Figure 10:
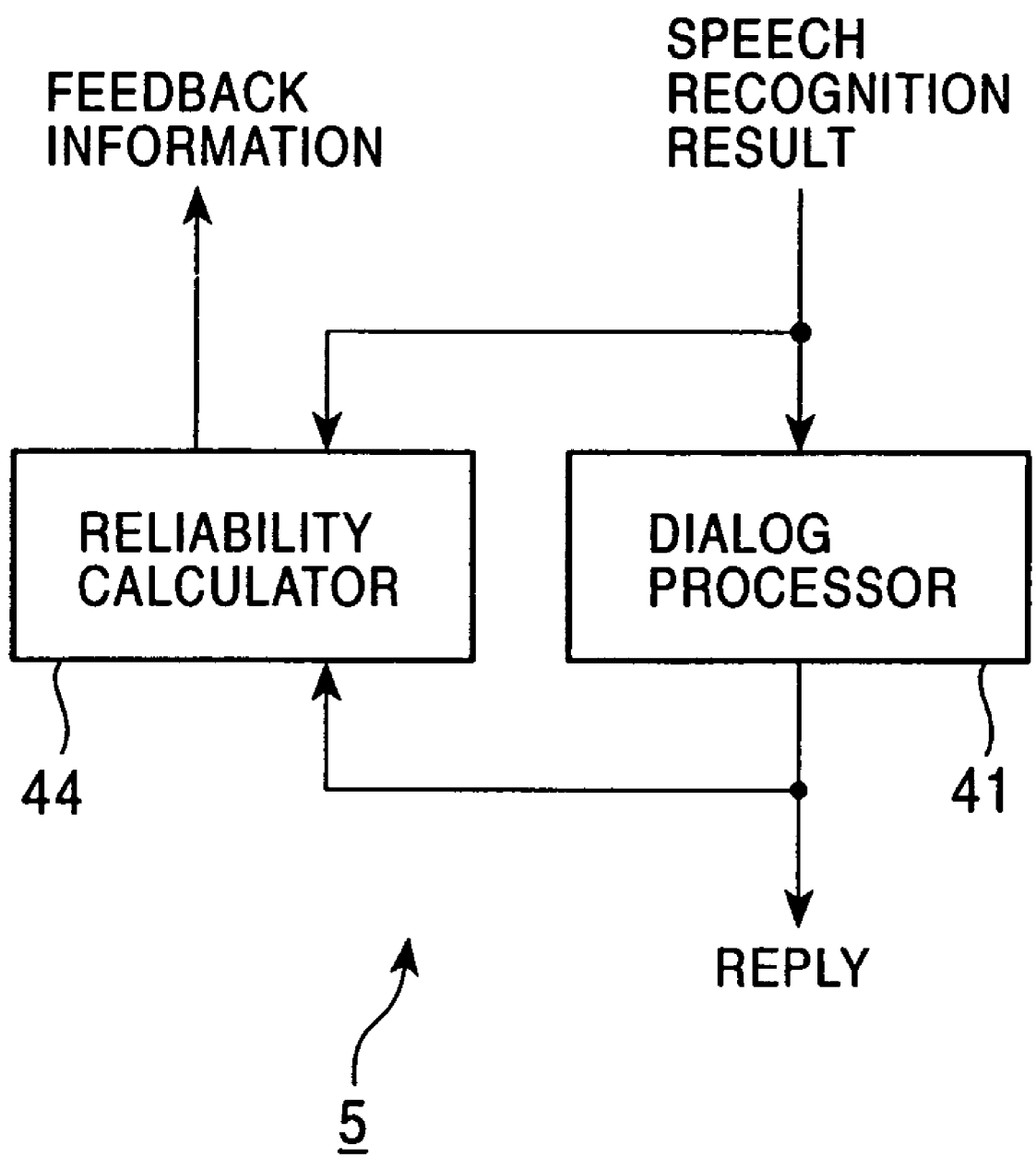
FIG. 10 is a block diagram illustrating a third example of the configuration of the dialog management unit 5.

FIG. 10 illustrates a third example of the configuration of the dialog management unit 5 shown in FIG. 1. The same elements as those shown in FIG. 6 are designated with like reference numerals. That is, the dialog management unit 5 shown in FIG. 10 is configured similarly to that shown in FIG. 6, except that the speech zone detector 42 is substituted with a reliability calculator 44.

The reliability calculator 44 monitors replies output from the dialog processor 41. Based on the replies, the reliability calculator 44 calculates the reliability of the speech recognition result output from the speech recognition unit 1, and feeds back the calculated reliability to the adaptation processor 19 as the feedback information.

Figure 11:
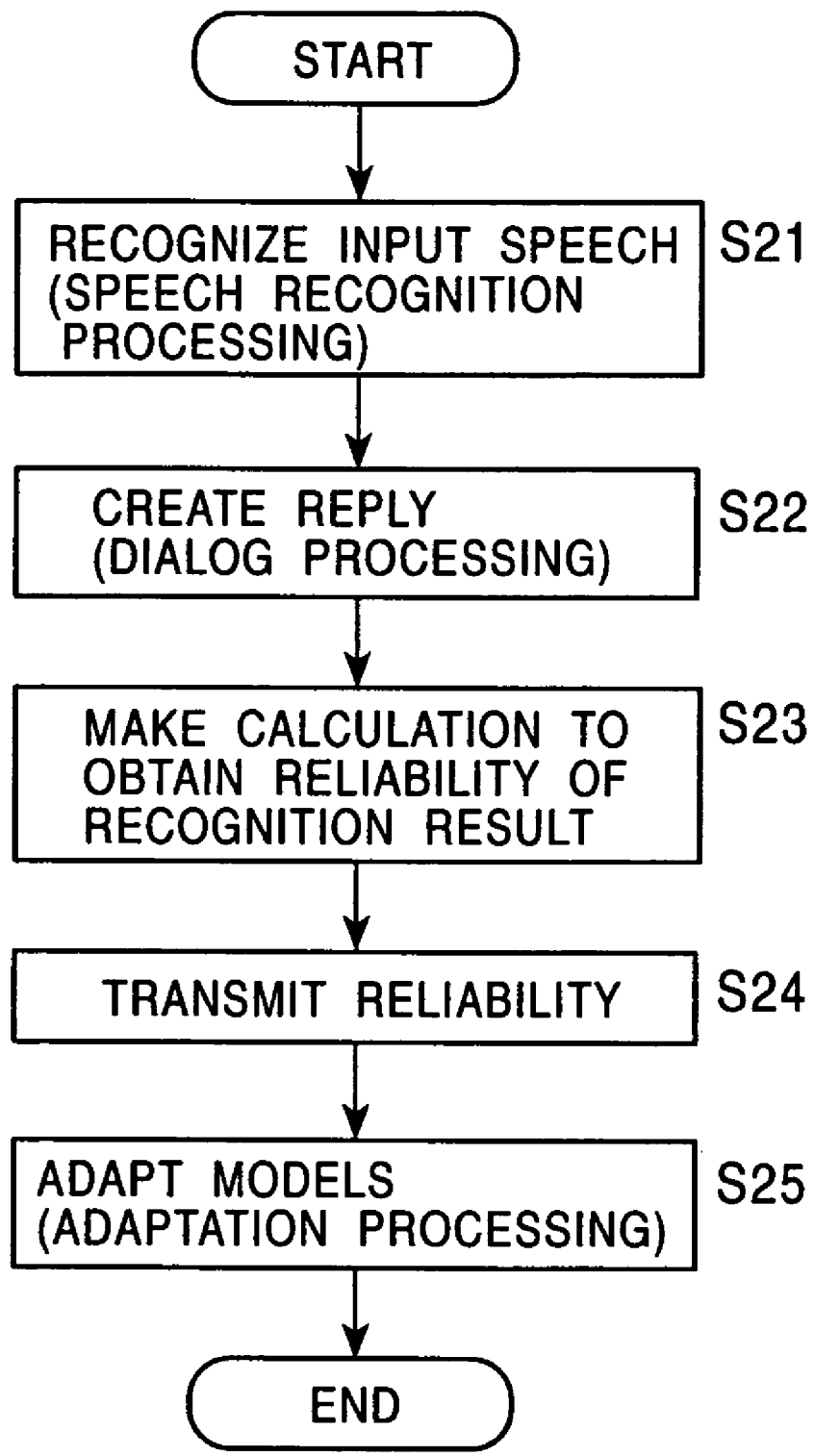
FIG. 11 is a flow chart illustrating a third example of the operation of the speech processing system.

A description is now given, with reference to the flow chart of FIG. 11, of the operation of the speech processing system shown in FIG. 1 which is provided with the speech recognition unit 1 such as the one shown in FIG. 3 and the dialog management unit 5 such as the one shown in FIG. 10.

In steps S21 and S22, the processes similar to those of steps S1 and S2, respectively, of FIG. 7 are executed. Then, a reply to the speech recognition result from the speech recognition unit 1 is output from the dialog processor 41.

Subsequently, in step S23, the reliability calculator 44 sets, for example, the number 0 or 1, as the reliability of the speech recognition result from the reply output from the dialog processor 41. Then, in step S24, the reliability calculator 44 transmits the calculated reliability to the adaptation processor 19 as the feedback information.

Then, in step S25, the adaptation processor 19 carries out adaptation of the models by using the reliability from the reliability calculator 44 as the feedback information. The processing is then completed.

According to the foregoing processing, models used for speech recognition can be adapted with high precision without imposing a burden on the user.

More specifically, it is now assumed, for example, that the aforementioned dialog from (1) to (8) is made between the speech processing system shown in FIG. 1 and the user. Then, the reliability calculator 44 determines that the speech recognition results of user's speech (1), (5), and (7) are correct from the corresponding replies (2), (6), and (8), respectively. On the other hand, the speech recognition result of user's speech (3) is determined to be wrong since the user re-issues speech (5) in response to the corresponding reply (4).

In this case, the reliability calculator 44 sets the reliabilities of the correct speech recognition results of user's speech (1), (5), and (7) to 1, and sets the reliability of the wrong speech recognition result of user's speech (3) to 0, and feeds back the calculated reliabilities to the adaptation processor 19. Then, the adaptation processor 19 performs adaptation of the models by employing user's speech (1), (3), (5), and (7) and the associated speech recognition results with weights according to the corresponding reliabilities.

The adaptation of models is thus conducted by using only the correct speech recognition results. It is thus possible to accomplish highly precise adaptation of the models without burdening the user.

As the reliability, intermediate values between 0 and 1 may be used, in which case, they can be calculated by using the likelihood of the speech recognition result from the speech recognition unit 1. In this case, adaptation of the models may be performed by using such reliabilities, for example, according to the following equation:

$$P_{new} = (1-(1-\alpha) \times R) \times P_{old} + (1-\alpha) \times R \times P_{adapt}$$

where $P_{new}$ represents the parameter of the adapted model (as stated above, which is the average value or the variance defining the transition probability or the output probability if the models are HMMs); ( indicates a predetermined constant for making adaptation; R designates the reliability; $P_{old}$ represents the parameter of the pre-adapted model; and $P_{adapt}$ indicates data used for adaptation, obtained from the user's speech.

Figure 12:
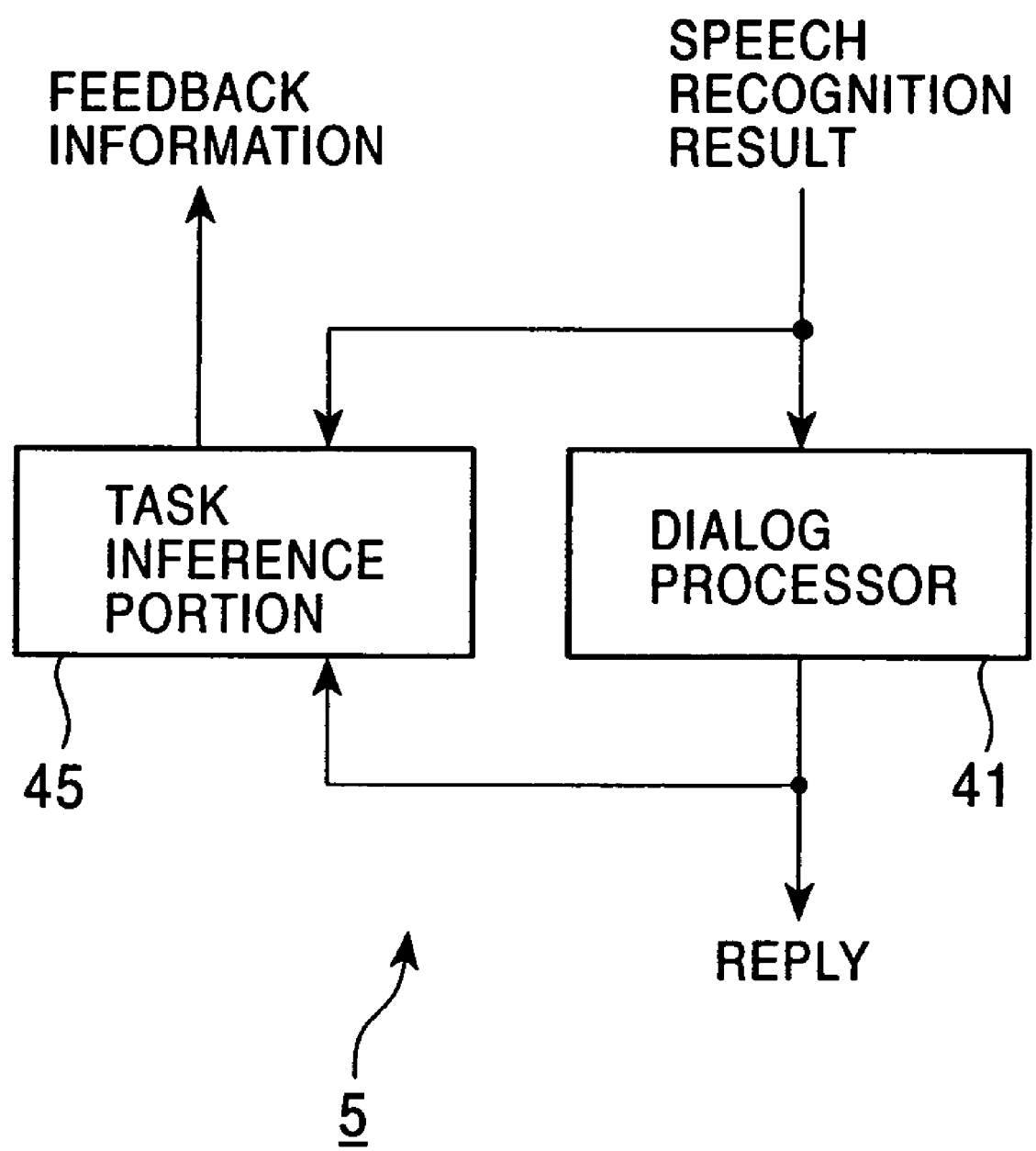
FIG. 12 is a block diagram illustrating a fourth example of the configuration of the dialog management unit 5.

FIG. 12 illustrates a fourth example of the dialog management unit 5 shown in FIG. 1. The same elements as those shown in FIG. 6 are indicated by like reference numerals. The dialog management unit 5 shown in FIG. 12 is configured similarly to the counterpart shown in FIG. 6, except that a task inference portion 45 is provided instead of the speech zone detector 42.

By monitoring the replies output from the dialog processor 41, the task inference portion 45 infers, based on the reply, the type of task corresponding to the speech recognition result output from the speech recognition unit 1 and feeds back the task to the adaptation processor 19 as the feedback information.

Figure 13:
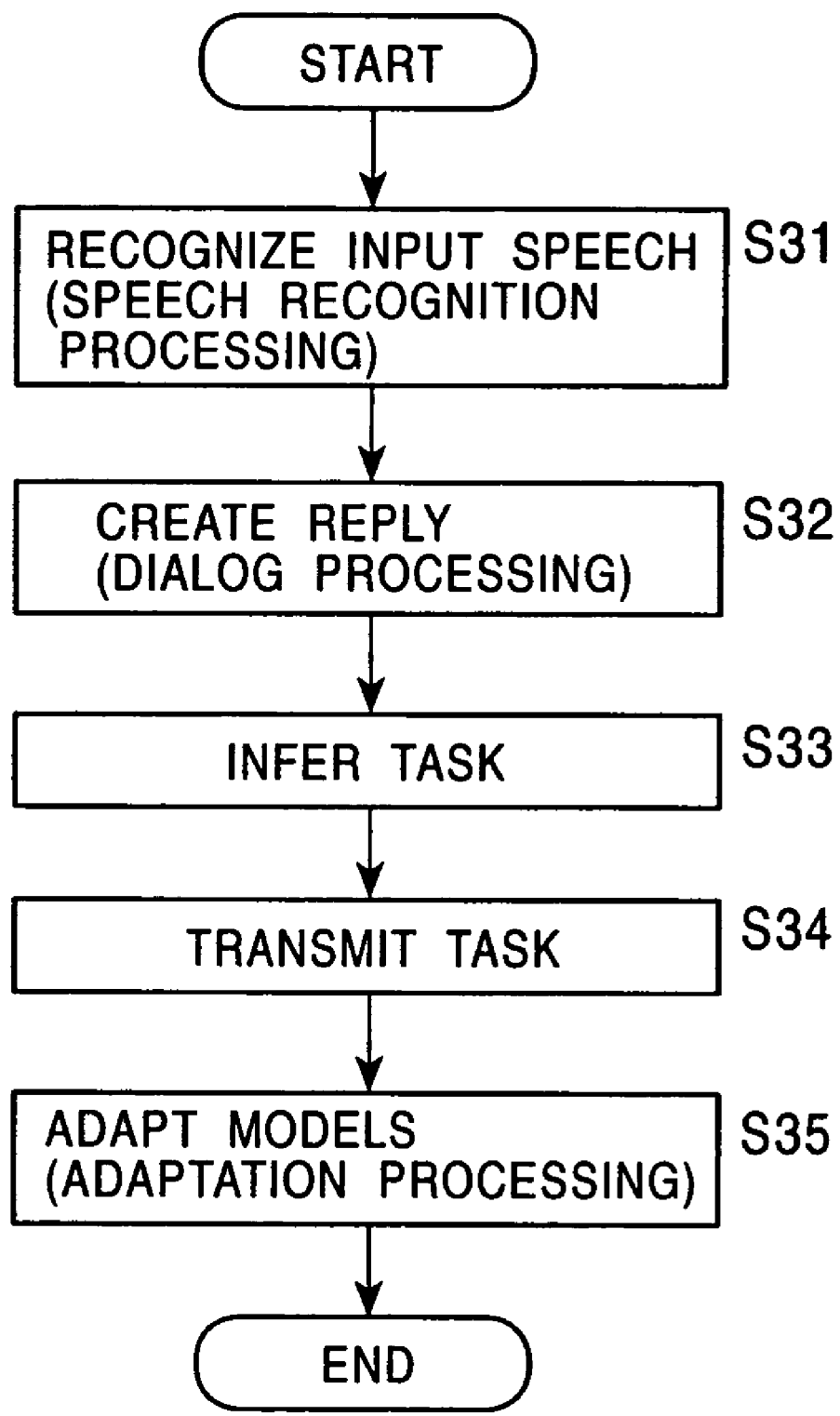
FIG. 13 is a flow chart illustrating a fourth example of the operation of the speech processing system.

A description is now given, with reference to the flow chart of FIG. 13, of the operation of the speech processing system shown in FIG. 1 provided with the speech recognition unit 1 such as the one shown in FIG. 1 and the dialog management unit 5 such as the one shown in FIG. 12. In this speech processing system, the dictionary database 17 of the speech recognition unit 1 stores dictionaries according to tasks, such as language models for reservations of concert tickets, language models for hotel reservations, language models for reservations of airline tickets, language models for dictations, such as newspaper reading, and other types of language models.

In steps S31 and S32, processes similar to those of steps S1 and S2, respectively, of FIG. 7 are executed. Then, a reply to the speech recognition result from the speech recognition unit 1 is output from the dialog processor 41.

In step S33, the task inference portion 45 infers the task (field or topic) associated with the speech recognition result from the speech recognition unit 1 from the reply output from the dialog processor 41. Then, in step S34, the task inference portion 45 sends the task to the adaptation processor 19 of the speech recognition unit 1 as the feedback information.

In step S35, the adaptation processor 19 performs adaptation of the models by using the task from the task inference portion 45 as the feedback information. The processing is then completed.

More specifically, it is now assumed that the aforementioned dialog from (1) to (8) is made between the speech processing system shown in FIG. 1 and the user. The task inference portion 45 infers from the speech recognition results of the user's speech and the associated replies that the task is concerned with a reservation for a concert ticket, and then feeds back the task to the adaptation processor 19. In this case, in the adaptation processor 19, among the language models sorted according to task in the dictionary database 17, only the language models for concert ticket reservations undergo adaptation.

It is thus possible to achieve highly precise adaptation of the models used for speech recognition without imposing a burden on the user.

In the dictionary database 17, data used for creating language models may be stored according to tasks rather than the language models themselves, in which case, the adaptation may be performed accordingly.

Although in the above-described example the language models sorted according to task are adapted, acoustic models sorted according to task may be adapted.

More specifically, to improve the recognition accuracy for numeric characters, acoustic models for numeric characters (hereinafter sometimes referred to as "numeric character models") are sometimes prepared separately from acoustic models for items other than numeric characters (hereinafter sometimes referred to as "regular acoustic models"). Details of speech recognition performed by distinguishing the numeric character models from the regular acoustic models are discussed in, for example, IEICE Research Report SP98-69, by Tsuneo KAWAI, KDD Research Lab.

When both the numeric character models and the regular acoustic models are prepared, the task inference portion 45 infers whether the task of the speech recognition result is concerned with numeric characters, and by using the inference result, the numeric character models and the regular acoustic models are adapted in the adaptation processor 19.

More specifically, it is now assumed, for example, that the above-described dialog (1) to (8) is made between the speech processing system shown in FIG. 1 and the user. Then, the task inference portion 45 infers from the speech recognition result of the user's speech and the associated reply that "9" and "1" in the speech recognition result of user's speech (1) "Hello. I'd like to have one ticket for the Berlin Philharmonic Orchestra on September 11." are a task of numeric characters, and feeds back such a task to the adaptation processor 19. In this case, in the adaptation processor 19, the numeric characters models are adapted by using the elements, such as "9" and "1", of the user's speech and the corresponding speech recognition result, while the regular acoustic models are adapted by using the other elements.

The adaptation of models may be performed by a combination of two or more of the four adaptation methods described with reference to FIGS. 6 through 13.

If the speech recognition result has been translated, the above-described feedback information is output from the machine translation unit 2 to the speech recognition unit 1.

Figure 14:
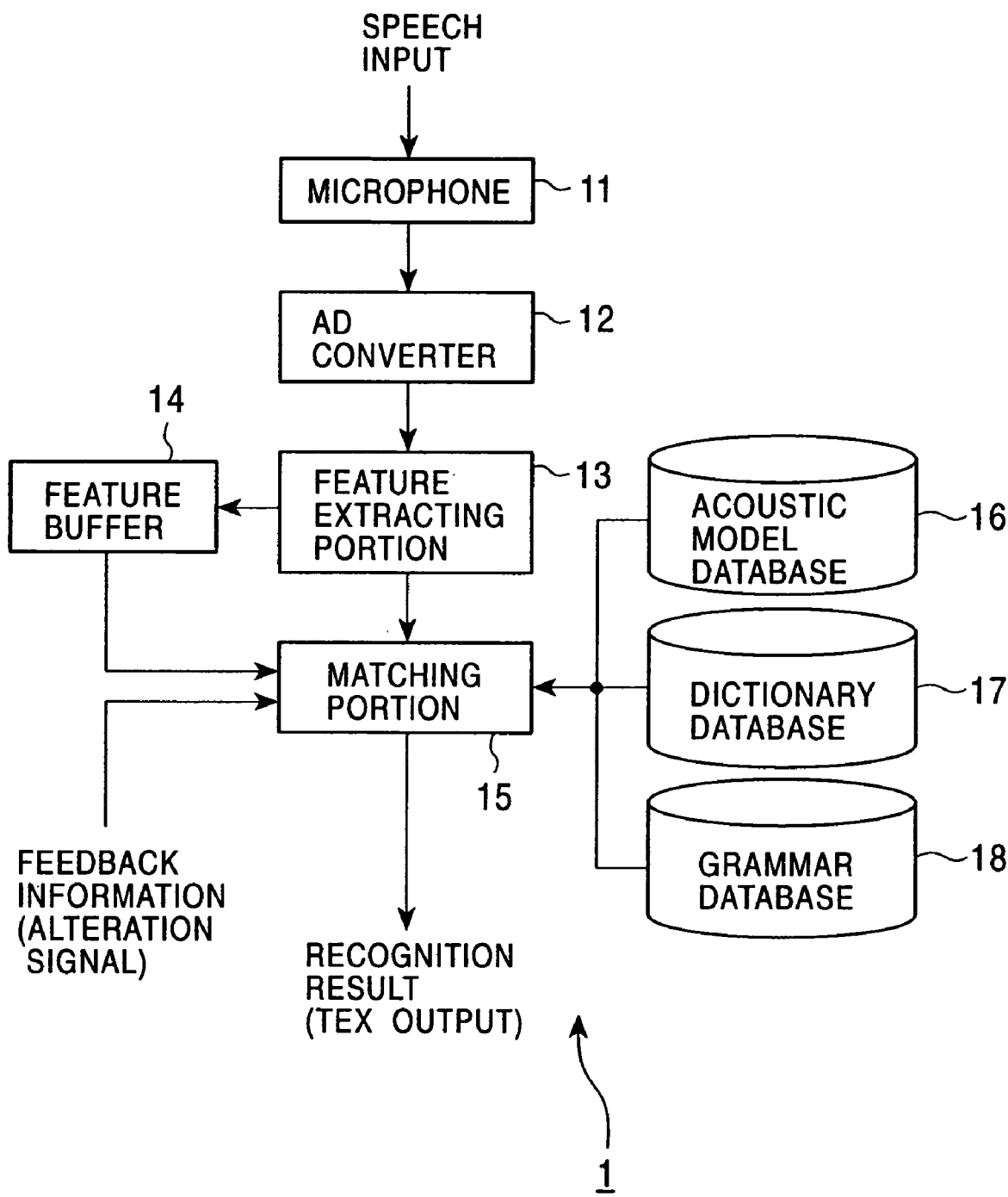
FIG. 14 is a block diagram illustrating a second example of the configuration of the speech recognition unit 1.

FIG. 14 illustrates a second example of the configuration of the speech recognition unit 1 shown in FIG. 1. The same elements as those shown in FIG. 3 are designated with like reference numerals. That is, the speech recognition unit 1 shown in FIG. 14 is basically configured similarly to the counterpart shown in FIG. 3, except that the adaptation processor 19 is not provided.

In the speech recognition unit 1 shown in FIG. 14, the matching portion 15 is adapted to receive an alteration signal, which will be discussed in detail, from the machine translation unit 2 as the feedback information. Upon receiving the alteration signal, the matching portion 15 alters the unit which forms a speech recognition result (hereinafter sometimes referred to as "forming unit").

More specifically, it is now assumed that a speech recognition result "kore wa nan desu ka?" (which means "What is this?") is obtained in response to input speech "kore wa nan desu ka?". In this case, upon receiving the alteration signal, the matching portion 15 alters the forming unit of the speech recognition result from one unit, i.e., "kore wa nan desu ka?" into three units, i.e., "korewa", "nandesu", and "ka", or into five units, i.e., "kore", "wa", "nan", "desu", and "ka", before outputting the recognition result.

Such an alteration may be made by disconnecting the words or phrases forming the initially obtained speech recognition result "kore wa nan desu ka?", or by altering the unit of speech recognition processing (hereinafter sometimes referred to as "processing unit") executed by the matching portion 15.

In the second case, the information for altering the processing unit may be stored in the word dictionary in the dictionary database 17 or in the grammar rules in the grammar database 18.

More specifically, for example, the phrase "korewa" is stored in the word dictionary in correspondence with words (morphemes) "kore" and "wa" forming such a phrase. Accordingly, by referring to the word dictionary, the matching portion 15 may obtain the speech recognition result forming one unit "korewa" or the speech recognition result forming two units "kore" and "wa" in response to the input speech "korewa".

Although in the above-described example phrases are associated with the corresponding words (morphemes), sentences may be associated with the corresponding phrases, or with the corresponding phrases and words.

Alternatively, if the grammar rules in the grammar database 18 are used for altering the unit of speech recognition processing executed by the matching portion 15, certain rules may be stored in the grammar rules in the grammar database 18. For example, the rule that the subject is formed by connecting the pronoun "kore" and the particle "wa" may be stored in the grammar rules. In this case, as well as in the previous case, by referring to the grammar rules, in response to the input speech "korewa" which represents the subject formed by the pronoun "kore" and the particle "wa", the matching portion 15 obtains the speech recognition result forming one unit, i.e., "korewa" or the speech recognition result forming two units, i.e., "kore" and "wa".

The aforementioned alteration of the processing unit may be made by using one or both of the word dictionary and the grammar rules. Moreover, a plurality of word dictionaries may be prepared, and corresponding grammar rules may be prepared accordingly. In this case, upon receiving an alteration signal, a combination of the required word dictionary and grammar rules may be selected.

If it becomes necessary to alter the forming unit by the alteration of the processing unit, the matching portion 15 re-processes the speech recognition result by using feature parameters stored in the feature buffer 14.

Figure 15:
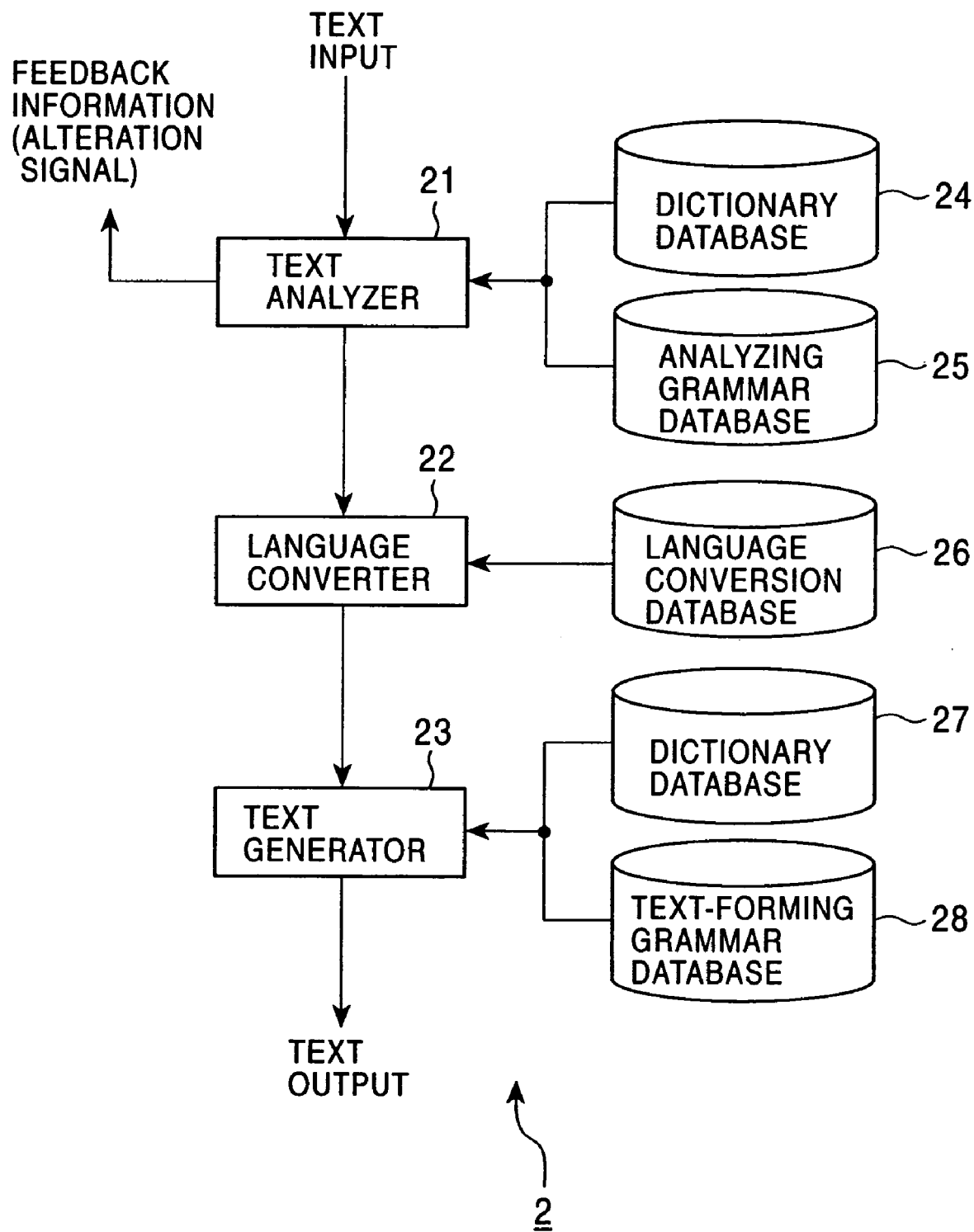
FIG. 15 is a block diagram illustrating a second example of the configuration of the machine translation unit 2.

FIG. 15 illustrates a second example of the configuration of the machine translation unit 2 when the speech recognition unit 1 is constructed such as the one shown in FIG. 14. The same elements as those shown in FIG. 4 are indicated by like reference numerals. Basically, the machine translation unit 2 shown in FIG. 15 is configured similarly to the counterpart shown in FIG. 4.

In the machine translation unit 2 in FIG. 15, the text analyzer 21 determines whether the forming unit of input text is appropriate for analyzing the text, and if so, analyzes the input text, as discussed above. Conversely, if the forming unit of the input text is not appropriate for analyzing the text, the text analyzer 21 sends an alteration signal to instruct an alteration of the forming unit to the speech recognition unit 1 as the feedback information. As stated above, the speech recognition unit 1 alters the forming unit of the speech recognition result based on the alteration signal. As a result, the speech recognition result with the altered forming unit is supplied to the text analyzer 21 as the input text. Then, the text analyzer 21 re-determines whether the forming unit is appropriate for analyzing the text. Thereafter, processing similar to the one described above is repeated.

As in the case of the machine translation unit 2, the dialog management unit 5 performs dialog management processing, which is one type of natural language processing, on the speech recognition result obtained from the speech recognition unit 1. In this case, the dialog management unit 5 may send an alteration signal to the speech recognition unit 1 if required.

Figure 16:
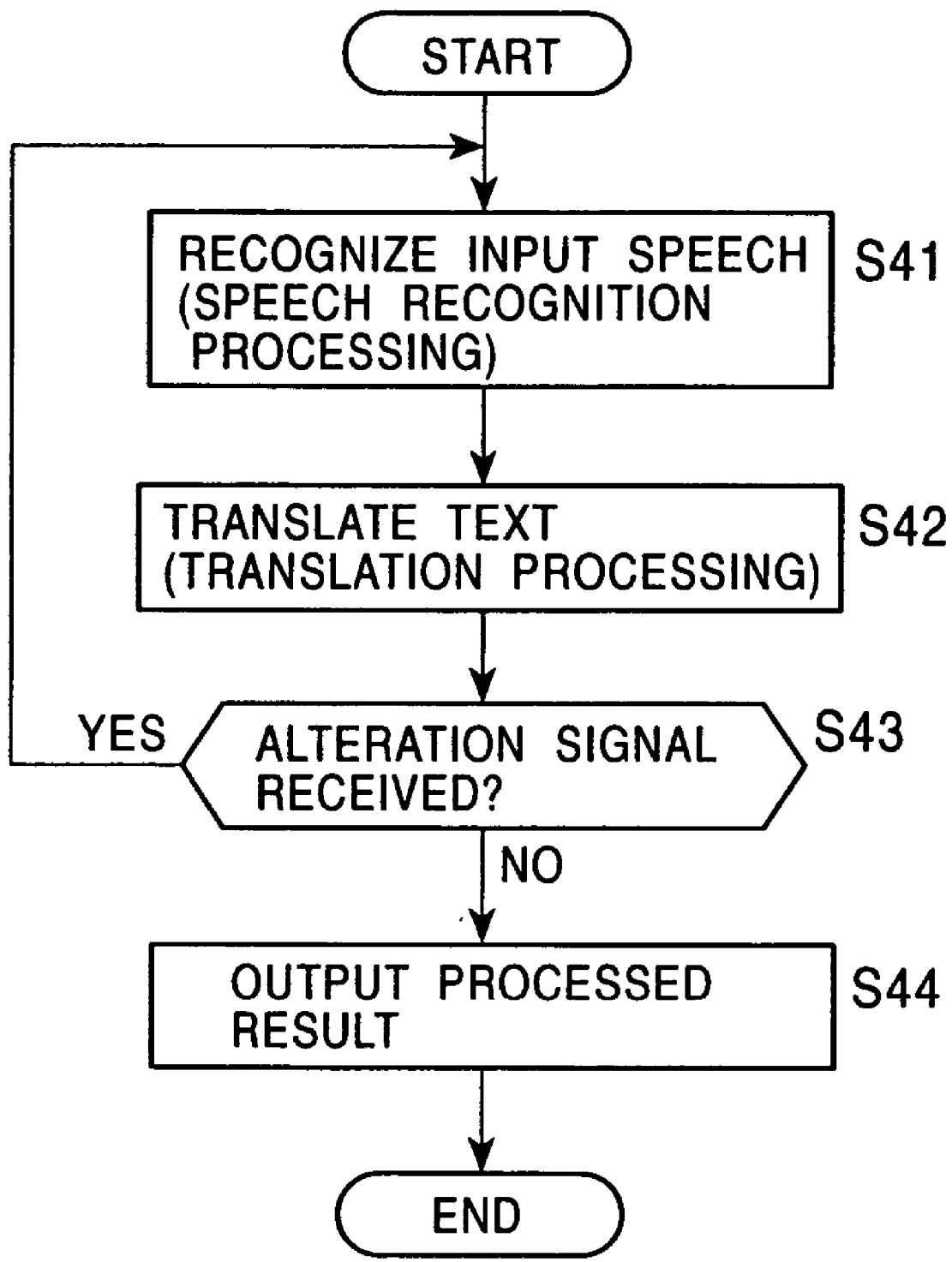
FIG. 16 is a flow chart illustrating a fifth example of the operation of the speech processing system.

A description is given below, with reference to the flow chart of FIG. 16, of the operation of the speech processing system (translation operation) shown in FIG. 1 when the speech recognition unit 1 and the machine translation unit 2 are configured, as those shown in FIGS. 14 and 15, respectively.

Upon receiving input speech, in step S41, the speech recognition unit 1 recognizes the speech and outputs text to the machine translation unit 2 as the speech recognition result. The process then proceeds to step S42.

In step S42, the machine translation unit 2 machine-translates the text from the speech recognition unit 1. Then, it is determined in step S43 whether an alteration signal has been received in the speech recognition unit 1 from the machine translation unit 2 as the feedback information.

If the outcome of step S43 is yes, the process returns to step S41 in which the speech recognition unit 1 changes the forming unit of the speech recognition result in response to the alteration signal, and then, re-performs the speech recognition processing and outputs the new speech recognition result to the machine translation unit 2. Thereafter, processing similar to the one described above is repeated.

If it is found in step S43 that an alteration signal has not been received from the machine translation unit 2 as the feedback information, the machine translation unit 2 outputs the text obtained as a result of the translation processing in step S42 to the speech synthesizing unit 3, and the process proceeds to step S44.

In step S44, the speech synthesizing unit 3 composes a synthesized speech corresponding to the text output from the machine translation unit 2, and outputs it. The processing is then completed.

Figure 17:
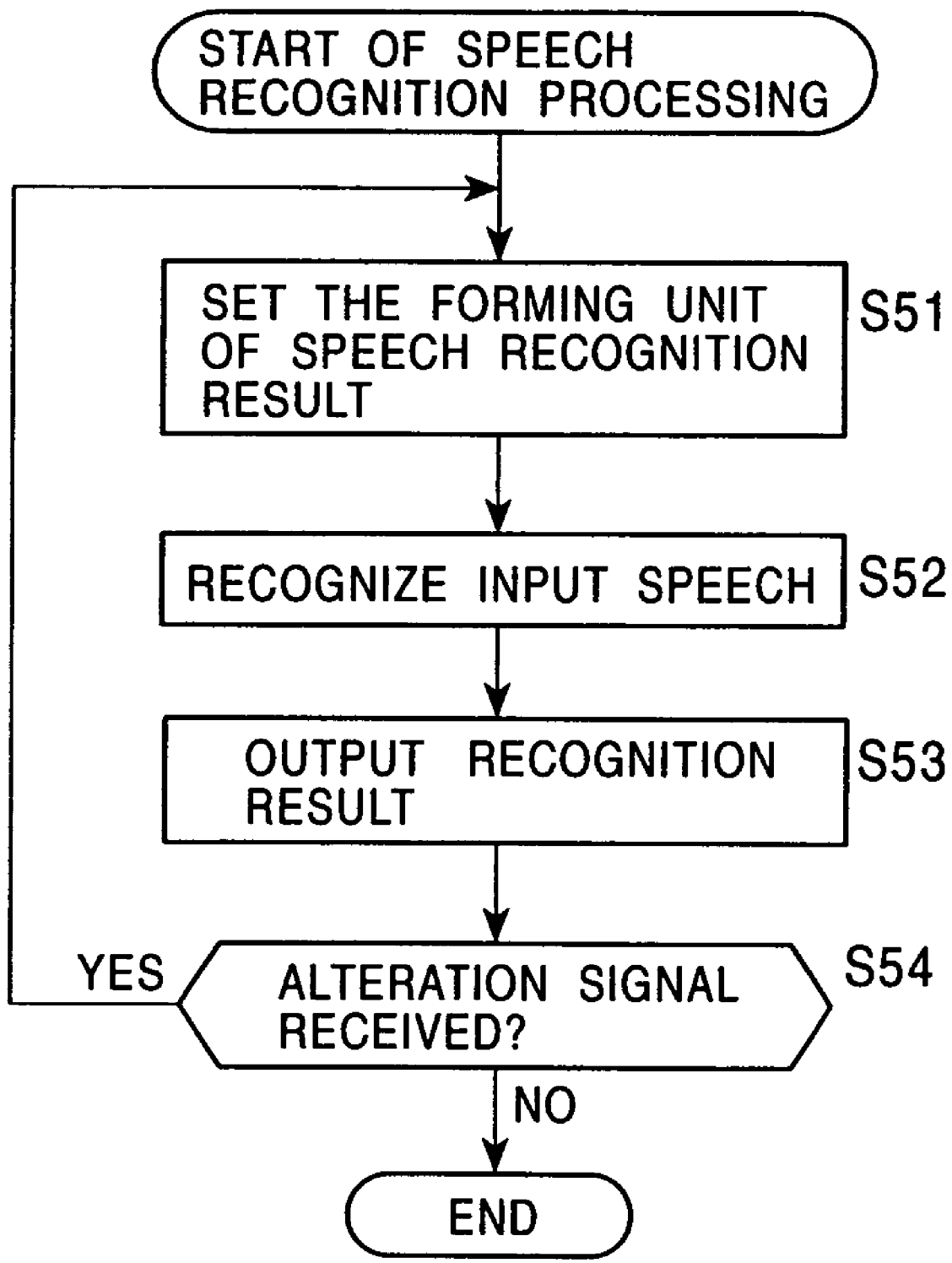
FIG. 17 is a flow chart illustrating the operation of the speech recognition unit 1 shown in FIG. 14.

The operation of the speech recognition unit 1 shown in FIG. 14 is discussed below with reference to the flow chart of FIG. 17.

Upon receiving input speech, in step S51, the speech recognition unit 1 sets the forming unit of the speech recognition result corresponding to the input speech. Immediately after a new speech is input, a predetermined default is set as the forming unit, in step S51.

In step S52, the speech recognition unit 1 recognizes the input speech. Then, in step S53, the speech recognition result obtained by using the forming unit which was set in step S51 is output to the machine translation unit 2. The process then proceeds to step S54 in which it is determined whether an alteration signal has been received from the machine translation unit 2 as the feedback information. If the outcome of step S54 is yes, the process returns to step S51. In step S51, the previously set forming unit of the speech recognition result is increased or decreased based on the alteration signal. More specifically, the forming unit may be changed from phrase to word (decreased), or conversely, from word to phrase (increased). Subsequently, the process proceeds to step S52, and the processing similar to the one discussed above is repeated. As a result, in step S53, the speech recognition result with a smaller or greater forming unit, which was newly set based on the alteration signal, is output from the speech recognition unit 1.

If it is found in step S54 that an alteration signal as the feedback information has not been received from the machine translation unit 2, the processing is completed.

Figure 18:
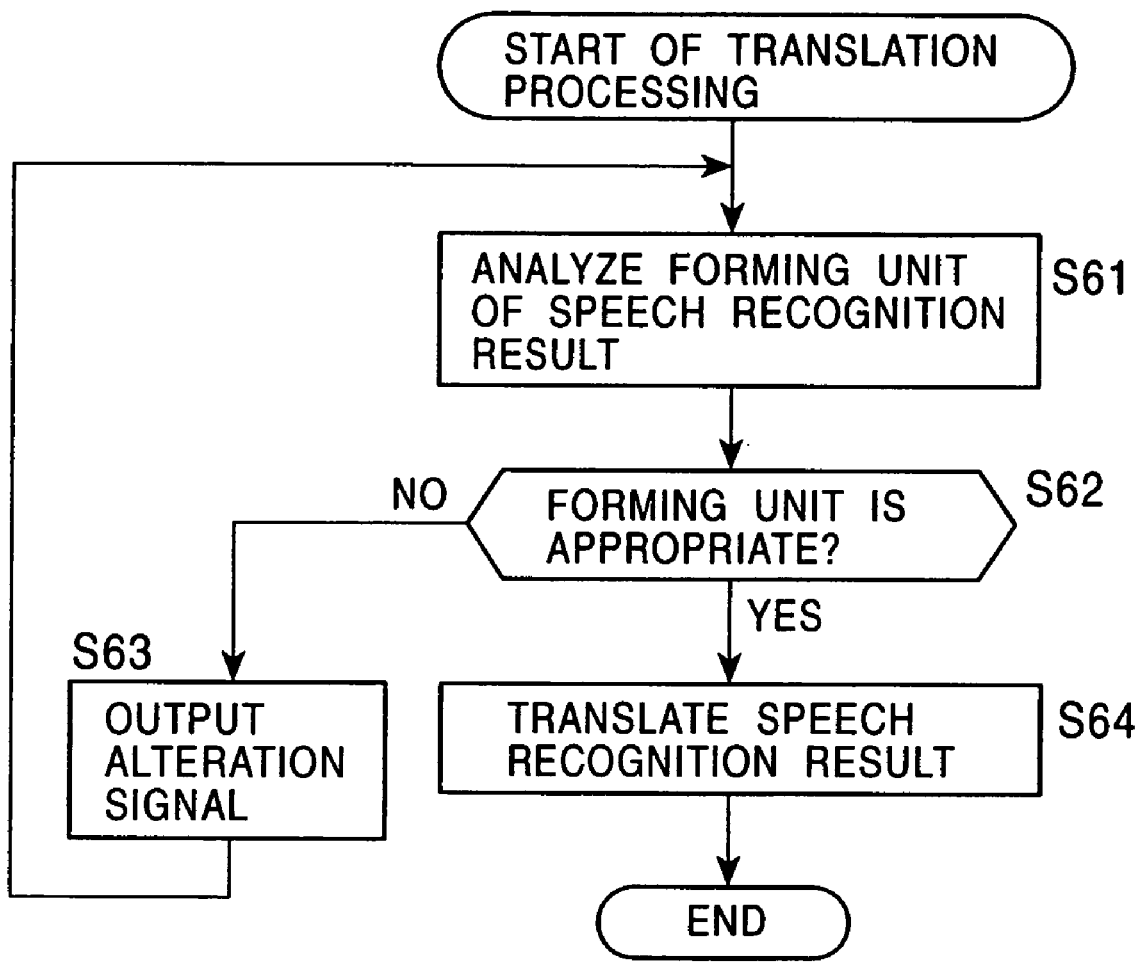
FIG. 18 is a flow chart illustrating the operation of the machine translation unit 2 shown in FIG. 15.

The operation of the machine translation unit 2 shown in FIG. 15 is now discussed with reference to the flow chart of FIG. 18.

Upon receiving text as a speech recognition result from the speech recognition unit 1, in step S61, the machine translation unit 2 analyzes the forming unit of the text. It is then determined in step S62 whether the forming unit is suitable for the processing to be executed in the machine translation unit 2.

The determination in step S62 may be made by analyzing the morphemes of the speech recognition result. Alternatively, the determination in step S62 may be made as follows. Character strings forming the unit suitable for the processing to be executed in the machine translation unit 2 may be stored in advance, and the forming unit of the speech recognition result may be compared with the character strings.

On the other hand, if it is found in step S62 that the forming unit of the text is not appropriate for the processing to be executed in the machine translation unit 2, the process proceeds to step S63. In step S63, an alteration signal for instructing the speech recognition unit 1 to increase or decrease the forming unit to be a suitable one is output to the speech recognition unit 1 as the feedback information. Then, the machine translation unit 2 waits for the supply of the speech recognition result with an altered forming unit from the speech recognition unit 1, and upon receiving it, the process returns to step S61. Thereafter, processing similar to the aforementioned one is repeated.

If it is found in step S62 that the forming unit of the text as the speech recognition result from the speech recognition unit 1 is appropriate for the processing to be executed in the machine translation unit 2, the process proceeds to step S64 in which the speech recognition result is processed in the machine translation unit 2.

That is, the machine translation unit 2 translates the speech recognition result, and outputs the translated result. Then, the processing is completed.

As discussed above, in response to an instruction from the machine translation unit 2, which performs natural language processing, the speech recognition unit 1 alters the forming unit of the speech recognition result to one suitable for the natural language processing, thereby enabling the machine translation unit 2 to easily perform natural language processing (translation) with high precision.

The dialog management unit 5 may also output the above-described alteration signal to the speech recognition unit 1 as format information so as to allow the speech recognition unit 1 to output the speech recognition result with a unit suitable for the processing to be executed in the dialog management unit 5.

Figure 19:
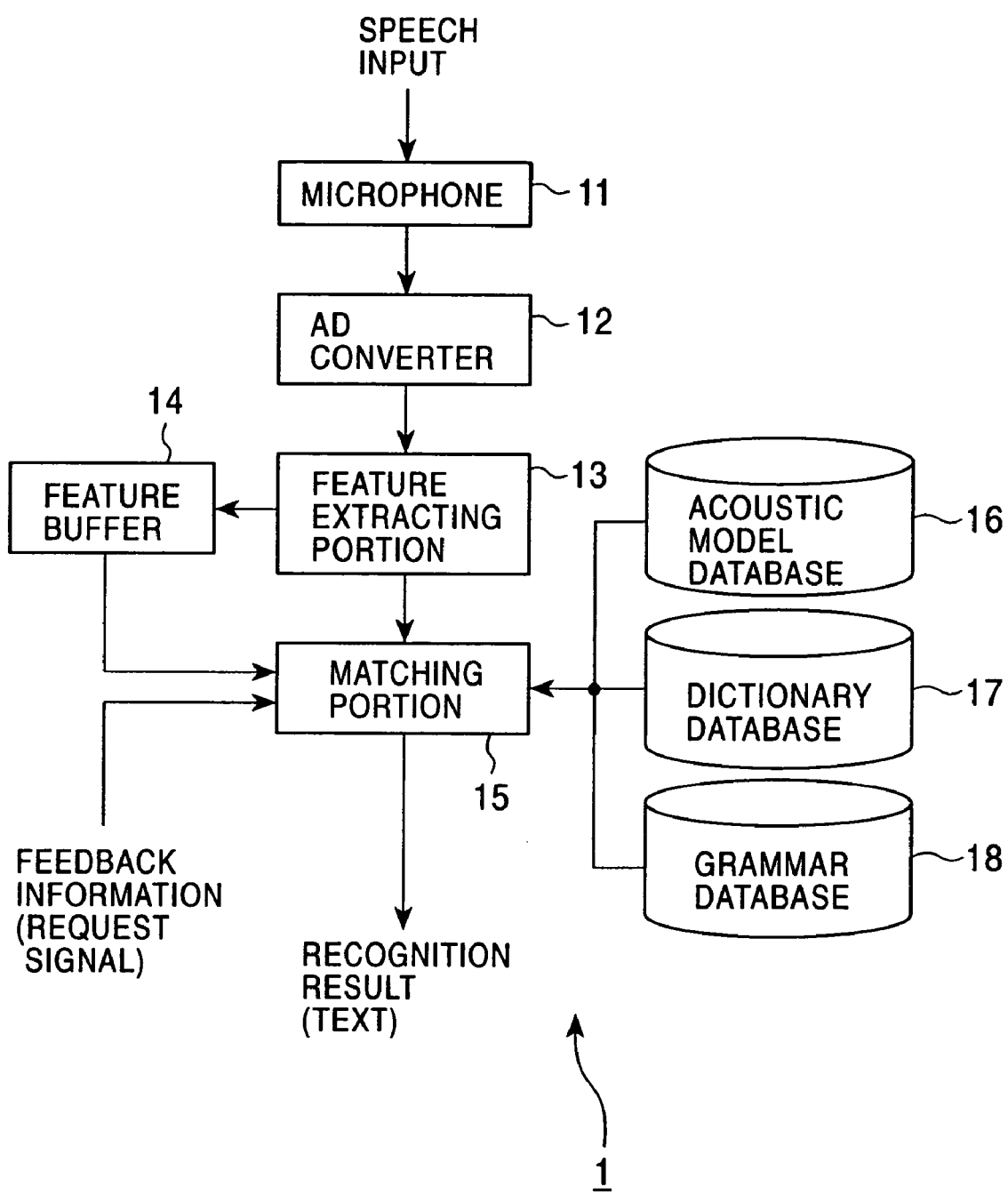
FIG. 19 is a block diagram illustrating a third example of the configuration of the speech recognition unit 1.

FIG. 19 illustrates a third example of the configuration of the speech recognition unit 1. The same elements as those shown in FIG. 3 are represented by like reference numerals. Basically, the speech recognition unit 1 shown in FIG. 19 is configured similarly to that shown in FIG. 3, except that the provision of the adaptation processor 19 is eliminated.

In the speech recognition unit 1 shown in FIG. 19, the matching portion 15 is adapted to receive a request signal, which will be discussed in detail below, from the machine translation unit 2 as the feedback information. Upon receiving a request signal, the speech recognition unit 1 performs processing in accordance with the request signal. In this case, when the processed feature parameters are required, the matching portion 15 executes processing by the use of the feature parameters stored in the feature buffer 14, thereby obviating the need to request the user to re-issue the speech.

Figure 20:
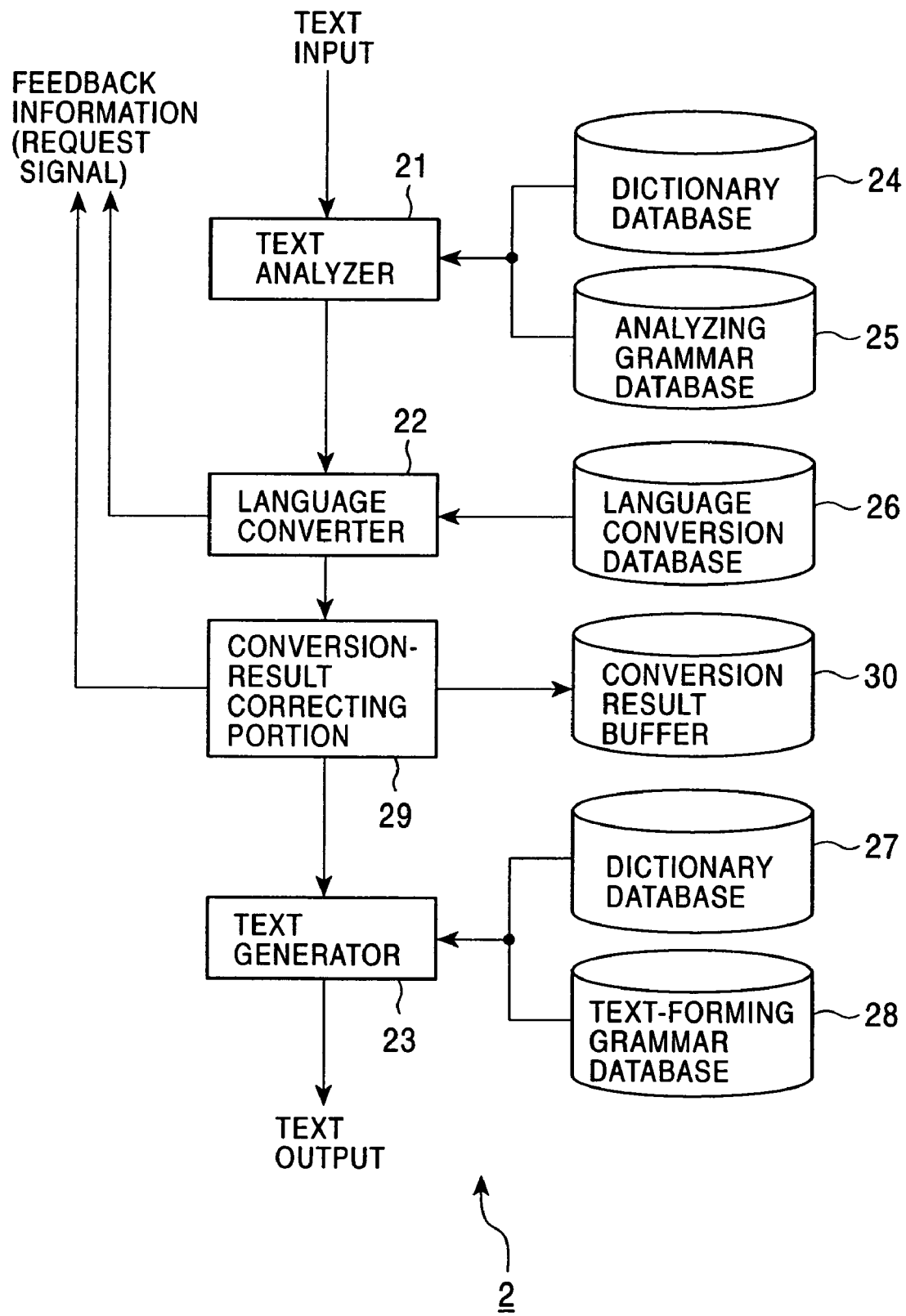
FIG. 20 is a block diagram illustrating a third example of the configuration of the machine translation unit 2.

FIG. 20 illustrates a third example of the configuration of the machine translation unit 2 shown in FIG. 1 when the speech recognition unit 1 is constructed such as the one shown in FIG. 19. The same elements as those shown in FIG. 4 are designated with like reference numerals. Basically, the machine translation unit 2 shown in FIG. 20 is configured similarly to the counterpart shown in FIG. 4, except that a conversion-result correcting portion 29 and a conversion result buffer 30 are provided.

In the machine translation unit 2 shown in FIG. 20, if the language converter 22 requires information necessary for performing high precision processing while executing the processing, it outputs a request signal, as the feedback information, for instructing the matching portion 15 of the speech recognition unit 1 shown in FIG. 19 to send the information. Upon receiving the information from the matching portion 15, the language converter 22 performs high precision processing.

The conversion-result correcting portion 29 receives the language information of the output language obtained from the language converter 22 and evaluates it. If the evaluation result satisfies predetermined criteria, the conversion-result correcting portion 29 supplies the language information from the language converter 22 to the text generator 23.

If the evaluation result of the language information does not satisfy the predetermined criteria, the conversion-result correcting portion 29 temporarily stores the language information in the conversion result buffer 30, and also outputs a request signal, as the feedback information, for requesting the matching portion 15 to send another possible recognition result. Then, in response to the request signal from the conversion-result correcting portion 29, the speech recognition unit 1 outputs another possible recognition result, which is then processed in the text analyzer 21 and the language converter 22 and is further supplied to the conversion-result correcting portion 29 as the language information of the output language. The conversion-result correcting portion 29 then compares the newly received language information with the language information stored in the conversion buffer 30, and upon comparison, selects the more suitable one as the translation result of the input text and outputs it to the text generator 23.

Figure 21:
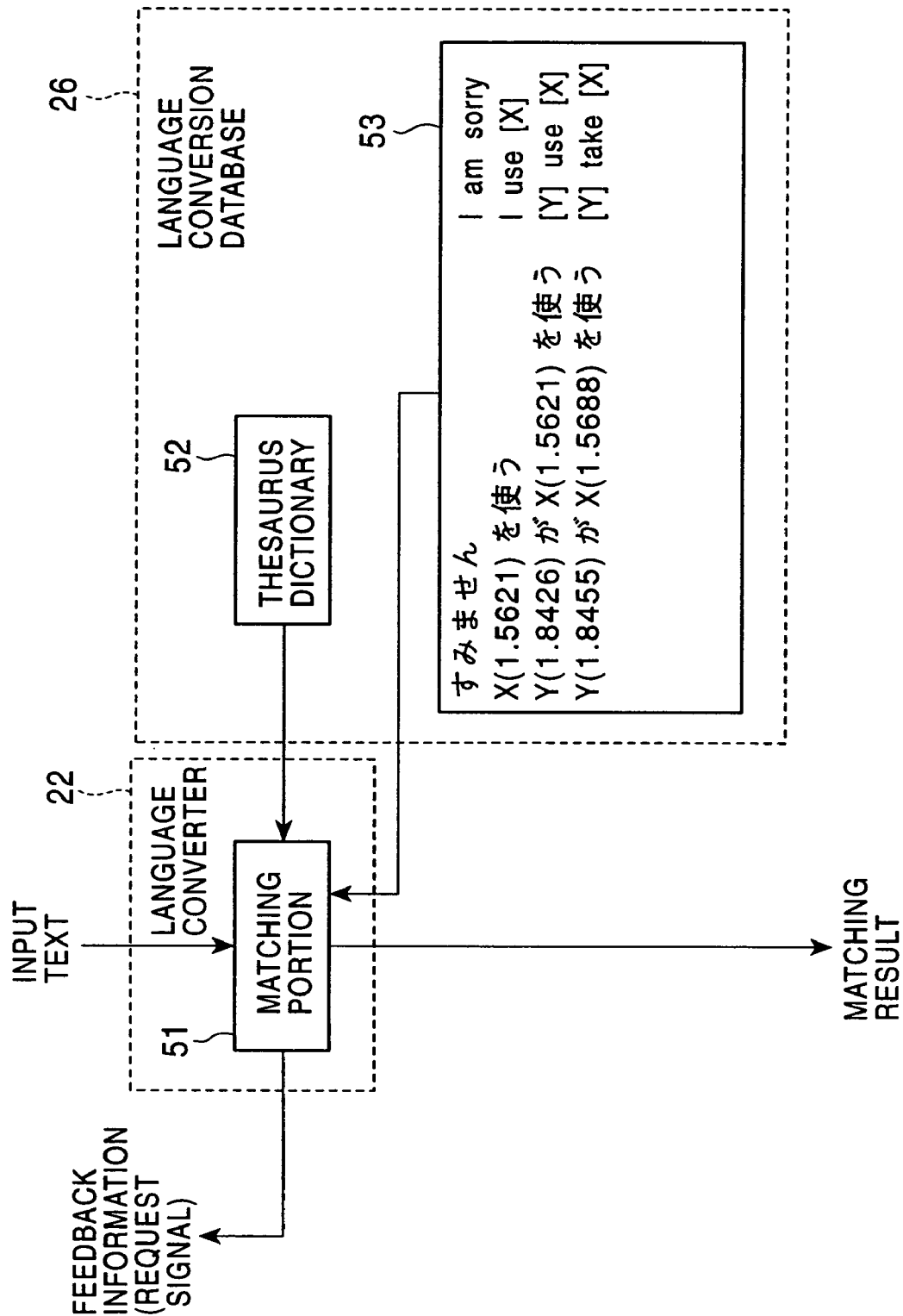
FIG. 21 is a block diagram illustrating an example of the configuration of a language converter 22 shown in FIG. 20.

FIG. 21 illustrates an example of the configuration of the language converter 22 and the language conversion database 26 shown in FIG. 20.

The language converter 22 is formed of the matching portion 51, which converts the language information of the input text supplied from the text analyzer 21 to that of the output language by referring to the language conversion database 26.

Figure 22:
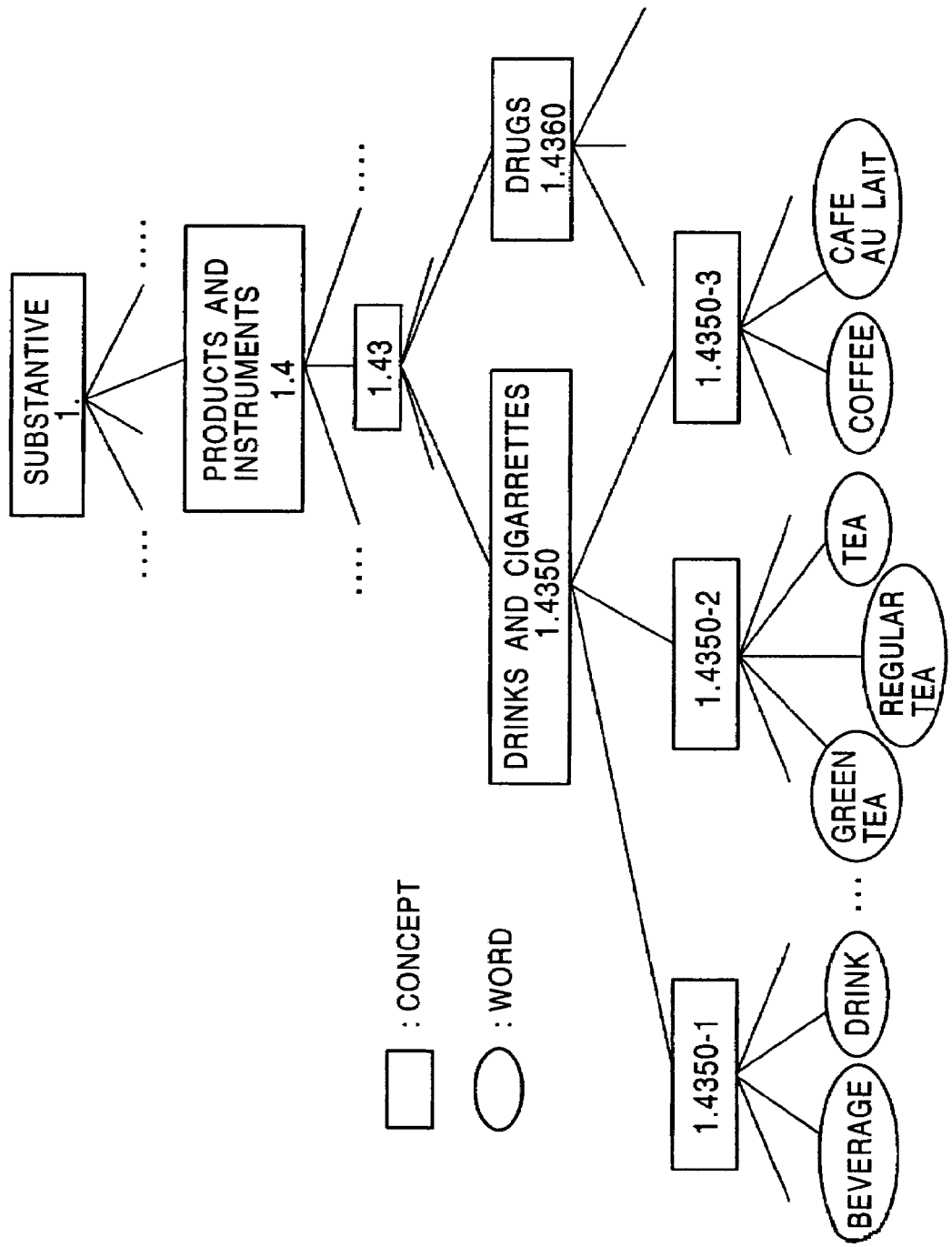
FIG. 22 illustrates an example of a thesaurus.

More specifically, the language conversion database 26 shown in FIG. 21 is formed of a thesaurus dictionary 52 and a template table 53. The thesaurus dictionary 52 stores, for example, as shown in FIG. 22, a thesaurus in which words and the associated concepts (meanings) are hierarchically classified. In the example shown in FIG. 22, descriptions in rectangles represent the concepts, while descriptions in ovals indicate words. The numbers indicated in the rectangles are classification numbers for specifying the concepts in the thesaurus.

Referring back to FIG. 21, the template table 53 registers templates in which Japanese sentence patterns are associated with those of English translations. In the templates, variables (X and Y in FIG. 21) are used in some Japanese sentence patterns. The numbers added to the variables represent the classification numbers in the thesaurus shown in FIG. 22.

In the language converter 22, the matching portion 51 selects the pattern of a Japanese sentence which is most similar (closest) to the input text from the templates stored in the template table 53. That is, the matching portion 51 determines the distance between the input text and the pattern of the Japanese sentence of each template in the template table 53, and then selects the template which contains the pattern closest to the input text. Further, the word corresponding to the variable in the pattern of the Japanese sentence of the selected template is extracted from the input text, and the semantic distance (hereinafter sometimes referred to as "inter-word distance") between the word and the concept to which the variable belongs is determined.

The inter-word distance between the variable of the selected template and the corresponding word may be determined by the minimum number required to shift from the node of the variable to the node of the corresponding word (the number of branches forming the shortest path from the variable node to the word node) in the thesaurus. If there is a plurality of variables in the selected template, the inter-word distance between each of the variables and the corresponding word is calculated.

The matching portion 51 selects the template and also finds the inter-word distance between the variable of the selected template and the corresponding word, and then outputs the selected template, the corresponding word, and the inter-word distance to the conversion-result correcting portion 29. Simultaneously, the matching portion 51 outputs the distance between the Japanese sentence pattern of the selected template and the input text (hereinafter sometimes referred to as "inter-pattern distance") to the conversion-result correcting portion 29. As discussed above, the inter-pattern distance is found when the template closest to the input text is selected.

More specifically, for example, when the input text is "kanazuchi wo tsukatta (A hammer was used)", the template having the Japanese sentence "X (1.5621) wo tsukau (X (1.5621) is used)" is selected. Then, the selected template, the corresponding word "kanazuchi (hammer)", the inter-pattern distance between the input text "kanazuchi wo tsukatta (A hammer was used)" and the Japanese sentence "X (1.5621) wo tsukau (X (1.5621) is used)", and the inter-word distance between the variable X (1.5621) and the corresponding word "kanazuchi (hammer)" are output to the conversion-result correcting portion 29.

Basically, the matching portion 51 selects the template which makes the inter-pattern distance between the input text and the Japanese sentence the shortest, as discussed above. However, it may be difficult to determine the exact template since there may be two or more templates which are possibly selected. In this case, the matching portion 51 outputs a request signal to request the speech recognition unit 1 to send information required for determining the template, and upon receiving the request signal, the matching portion 51 makes a determination.

The operation of the machine translation unit 2 shown in FIG. 20 is discussed below with reference to the flow chart of FIG. 23.

A description is given below of the operation of the machine translation unit 2 shown in FIG. 20 with reference to the flow chart of FIG. 23.

In the machine translation unit 2, upon receiving input text from the speech recognition unit 1 shown in FIG. 19 as a speech recognition result, in step S71, the storage content of the conversion result buffer 30 is cleared. Then, in step S72, the text analyzer 21 analyzes the input text and supplies the analysis result to the language converter 22. In step S73, the language converter 22 selects the template, as discussed with reference to FIG. 21, and converts the language information of the input text into that of the output text by using the selected template. The language converter 22 then outputs the selected template, the inter-pattern distance, the corresponding word, and the inter-word distance to the conversion-result correcting portion 29 as the conversion result.

Subsequently, in step S74, the conversion-result correcting portion 29 stores the language information (selected template, inter-pattern distance, corresponding word, and inter-word distance) of the output text in the conversion result buffer 30. It is then determined in step S75 whether the inter-word distance supplied from the language converter 22 is equal to or smaller than a predetermined reference value. If the outcome of step S75 is yes, namely, if the semantic distance between the concept to which the variable in the selected template belongs and the corresponding word in the input text is small, it can be inferred that the corresponding word in the input text be a correct speech recognition result. Accordingly, the process proceeds to step S76 in which the conversion-result correcting portion 29 outputs the language information of the output language stored in the conversion result buffer 30 in step S74 to the text generator 23. Then, the text generator 23 generates text of the output language translated from the input text. The processing is then completed.

In contrast, if it is found in step S75 that the inter-word distance is greater than the predetermined reference value, namely, if the semantic distance between the corresponding concept and the corresponding word of the input text is large, it can be inferred that the word of the input text is a wrong speech recognition result. In step S75, it is inferred that the recognized word sounds the same as the correct input word, but is different in meaning. Then, the process proceeds to step S77 in which the conversion-result correcting portion 29 outputs a request signal for requesting the speech recognition unit 1 shown in FIG. 19 to send another possible word, such as a homonym of the previously output word, to the speech recognition unit 1.

In response to this request signal, the speech recognition unit 1 re-performs speech recognition processing by using the feature parameters stored in the feature buffer 14, and then, supplies a homonym of the previously output word to the machine translation unit 2 shown in FIG. 20. The speech recognition processing performed on homonyms may be executed by storing various homonyms in the dictionary database 17 of the speech recognition unit 1.

A homonym of the previous word is supplied from the speech recognition unit 1 to the machine translation unit 2. Then, in step S78, the text analyzer 21 and the language converter 22 perform processing on the new word substituted for the previous word (hereinafter sometimes referred to as "substituted text"). Then, the processed result is output to the conversion-result correcting portion 29.

If there is a plurality of homonyms of the previous word, they may be supplied from the speech recognition unit 1 to the machine translation unit 2. In this case, the machine translation unit 2 prepares substituted text of each homonym.

Upon receiving the language information of the output language converted from the substituted text from the language converter 22, in step S79, the conversion-result correcting portion 29 compares the received language information with the language information stored in the conversion result buffer 30, and selects a more suitable one. That is, the conversion-result correcting portion 29 selects the language information which contains the smallest inter-word distance (i.e., the language information converted from the text having the word semantically closest to the concept to which the variable of the selected template belongs).

Then, the process proceeds to step S76 in which the conversion-result correcting portion 29 outputs the selected language information to the text generator 23, and the text generator 23 performs processing similar to the one discussed above. The processing is then completed.

If there are a plurality of substituted text, in step S79, among the language information converted from the substituted text and the language information stored in the conversion result buffer 30, the language information having the smallest inter-word distance is selected.

The aforementioned processing is explained more specifically below. It is now assumed, for example, that the input text is "kumo ga shiroi (The spider is white)", and the template having the Japanese sentence "X (1.4829) ga shiroi (X (1.4829) is white) is selected. The word corresponding to the variable X is "kumo (spider)", and if the semantic distance between the concept with the classification number 1.4829 and the corresponding word "kumo (spider)" is large, the conversion-result correcting portion 29 outputs the request signal described above to the speech recognition unit 1 shown in FIG. 19 as the feedback information. Then, if the speech recognition unit 1 outputs another possible word, such as a homonym of the previous word, "kumo (cloud)", to the machine translation unit 2 in response to the request signal, the machine translation unit 2 compares the two words and selects the word having a smaller semantic distance from the concept 1.4829.

Thus, even if the speech recognition unit 1 wrongly recognizes the input speech, in other words, even if a word which sounds the same as the actual word but is different in meaning is obtained (i.e., the word which is acoustically correct but is semantically wrong), the wrong recognition result can be corrected, thereby obtaining an accurate translation result.

The processing for selecting the template from the template table 53 performed in the matching portion 51 shown in FIG. 21 is discussed below with reference to the flow chart of FIG. 24.

In step S81, a certain template is selected from the template table 53. Then, in step S82, the inter-pattern distance between the Japanese pattern described in the selected template and the input text is calculated. It is then determined in step S83 whether the inter-pattern distance has been obtained for all the templates stored in the template table 53. If the result of step S83 is no, the process returns to step S81 in which another template is selected, and the processing similar to the aforementioned one is repeated.

If it is found in step S83 that the inter-pattern distance has been obtained for all the templates stored in the template table 53, the process proceeds to step S84 in which the template having the smallest inter-pattern distance (hereinafter sometimes referred to as the "first template") and the template having the second smallest inter-pattern distance (hereinafter sometimes referred to as the "second template") are detected. Then, a determination is made as to whether the difference between the inter-pattern distance of the first template and that of the second template is equal to or smaller than a predetermined threshold.

If the outcome of step S84 is no, i.e., if the Japanese sentence described in the first template is much closer to the input text than those of the other templates stored in the template table 53, the process proceeds to step S85 in which the first template is determined. The processing is then completed.

On the other hand, if it is found in step S84 that the difference of the inter-pattern distance is equal to or smaller than the predetermined threshold, that is, if the input text is similar to not only the Japanese sentence described in the first template, but also to that described in the second template, the process proceeds to step S86. In step S86, the matching portion 51 sends a request signal, as the feedback information, to request the speech recognition unit 1 shown in FIG. 19 to send an acoustic evaluation value for determining which template is closer to the input speech.

In this case, the speech recognition unit 1 is required to determine the likelihood that the input text is the Japanese sentence described in the first template and the likelihood that the input text is the Japanese sentence described in the second template by using the feature parameters stored in the feature buffer 14. Then, the speech recognition unit 1 outputs the likelihood values to the machine translation unit 2.

In the machine translation unit 2, the likelihood values of the first template and the second template are supplied to the matching portion 51 of the language converter 22 via the text analyzer 21. In step S87, the matching portion 51 selects the template having a higher likelihood value, and the processing is completed.

The aforementioned processing is explained more specifically below. It is now assumed, for example, that the speech recognition result "kanazuchi wo tsukai (by using a hammer)" has been obtained, and the Japanese sentence "X (1.23) wo tsukau (X (1.23) is used)" and the Japanese sentence "X (1.23) wo tsukae (use X (1.23))" are determined to be first template and the second template, respectively. In this case, if the difference between the inter-pattern distance of the first template and that of the second template is small, the likelihood values of the first template and the second template are determined. Then, in the machine translation unit 2, the template having a higher likelihood value is selected.

As a consequence, even if the speech recognition unit 1 wrongly recognizes the input speech, a wrong recognition result can be corrected, thereby obtaining an accurate translation result.

Figure 24:
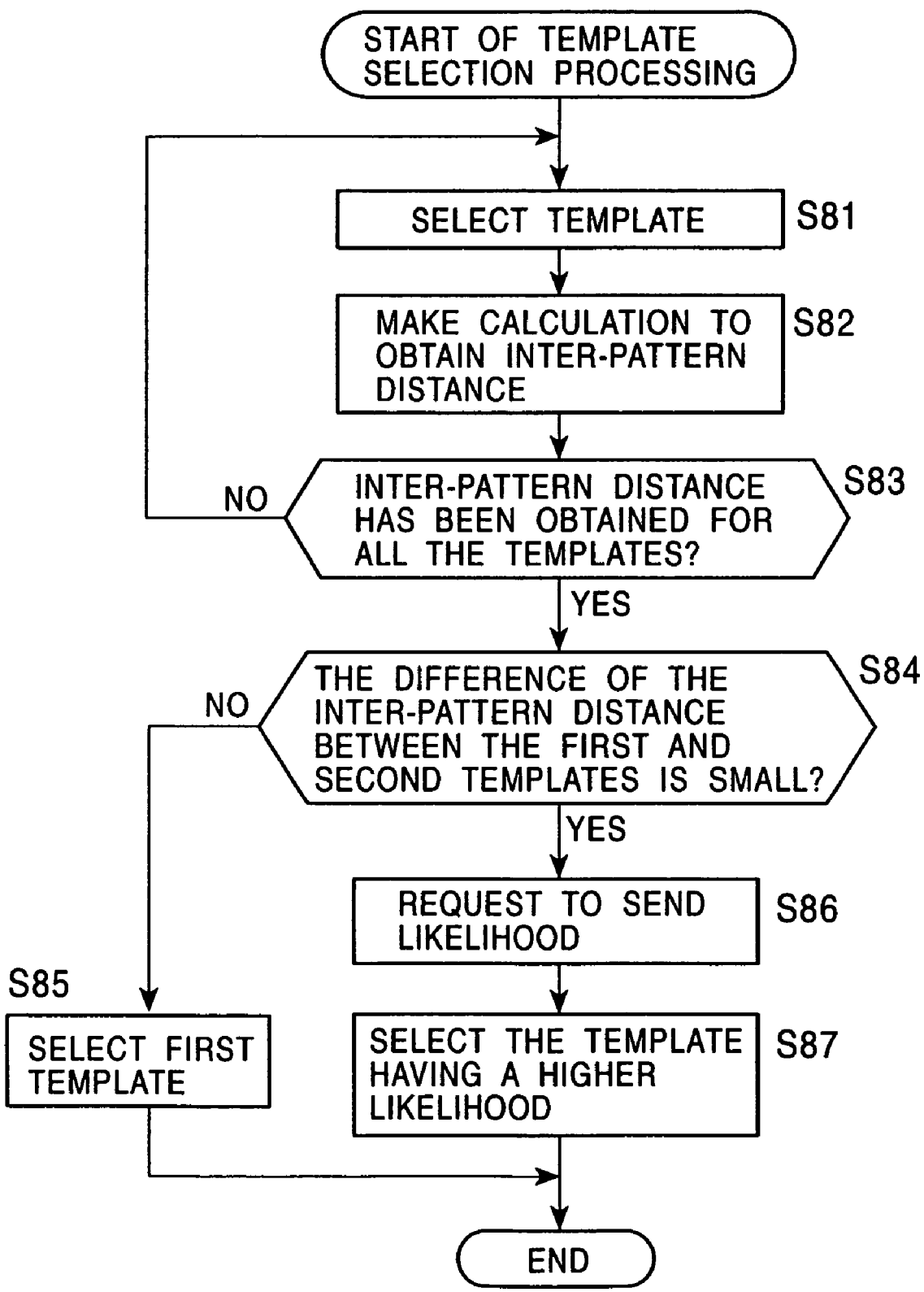
FIG. 24 is a flow chart illustrating template selection processing performed in a matching portion 51.

The above-described processing executed in accordance with the flow chart of FIG. 24 may be performed on the third and subsequent templates.

Figure 23:
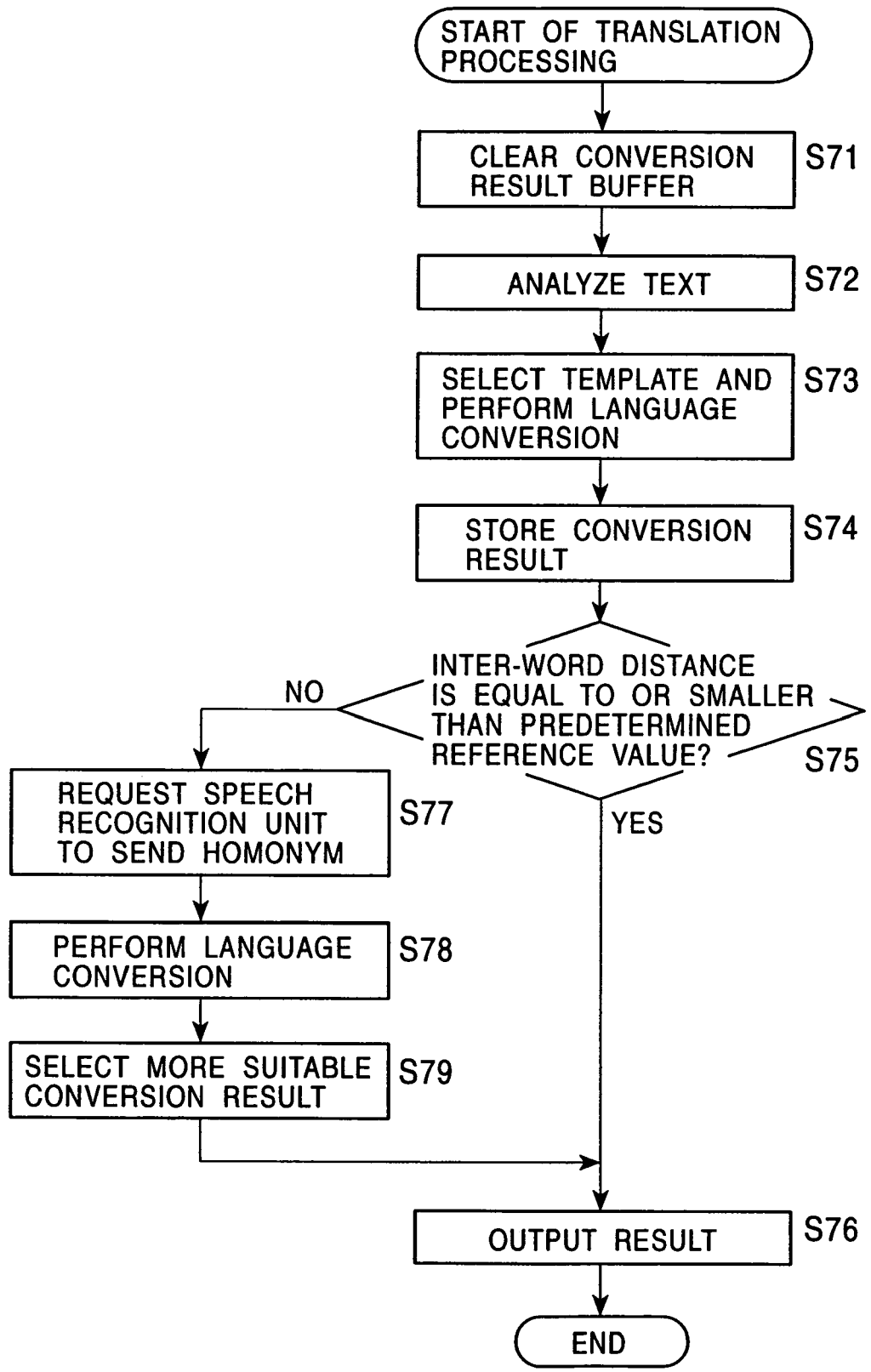
FIG. 23 is a flow chart illustrating a first example of the operation of the machine translation unit 2 shown in FIG. 20.

In the processing executed in accordance with the flow chart of FIG. 23, a wrong recognition result is corrected by selecting a homonym which is closest to the concept to which the variable in the selected template belongs. According to this processing, however, it is difficult to find such a homonym if there are a plurality of homonyms close to the corresponding concept.

It is now assumed, for example, that as the homonyms of X (1.4830) in the selected template "X (1.4839) de tabeta (ate it with X (1.4839)", three homonyms "hashi (bridge)", "hashi (edge)", and "hashi (chopsticks)" are obtained. If the semantic distances between the three homonyms and the corresponding concept are the same, it is very difficult to determine the exact word.

To deal with such a case, the machine translation unit 2 shown in FIG. 20 may send a request signal, as the feedback information, for requesting the speech recognition unit 1 to determine the most probable word as the speech recognition result based on prosody, such as accents and pitches, of the input speech.

For example, the above-described "hashi (bridge)", "hashi (edge)", and "hashi (chopsticks)" generally have the intonations shown in FIG. 25. Accordingly, the speech recognition unit 1 acquires the prosody of the input speech based on the feature parameters stored in the feature buffer 14, and detects which of the words "hashi (bridge)", "hashi (edge)", and "hashi (chopsticks)" appears to be closest to the prosody, thereby determining the most probable word as the speech recognition result.

Figure 26:
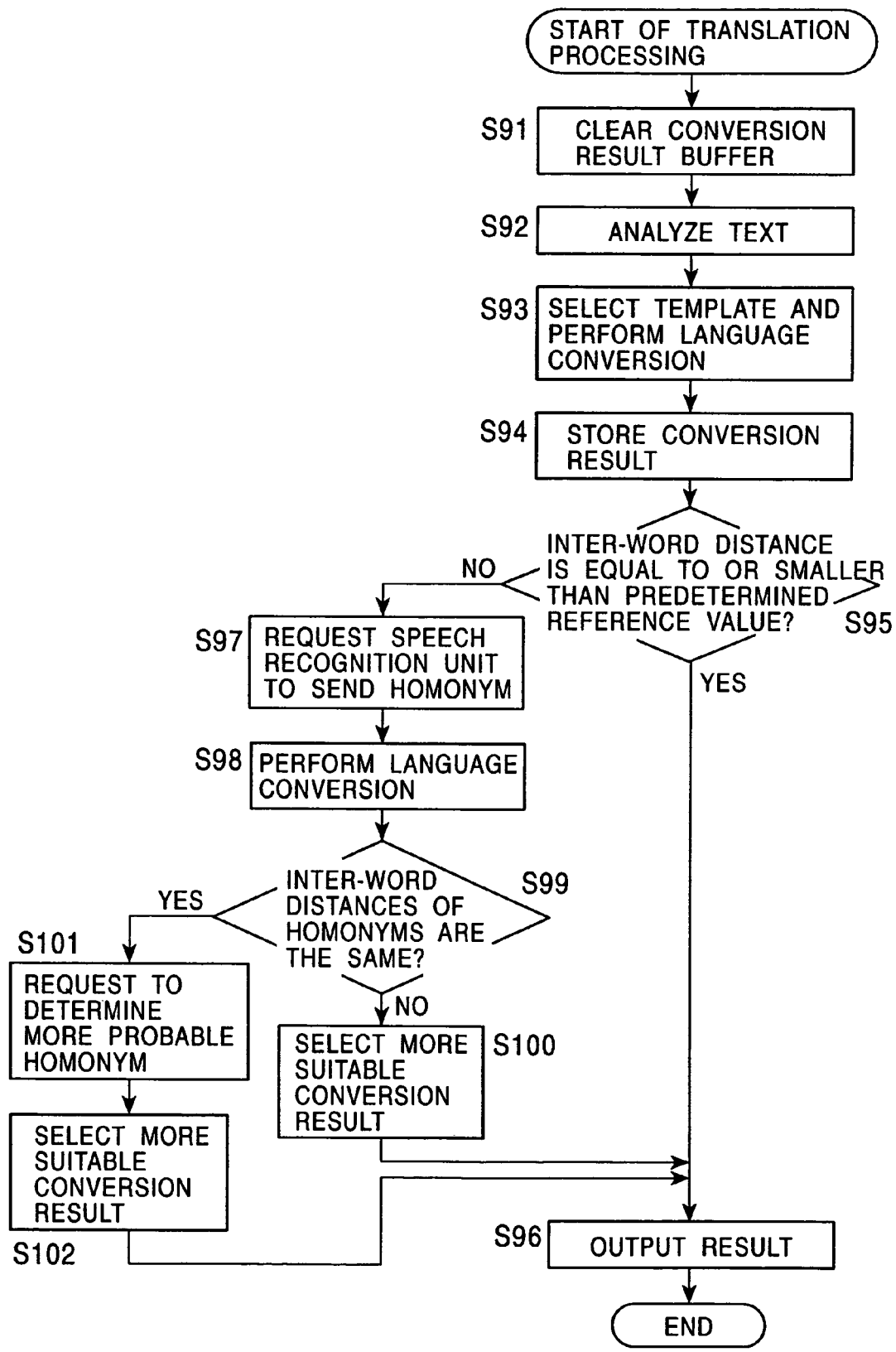
FIG. 26 is a flow chart illustrating a second example of the operation of the machine translation unit 2 shown in FIG. 20.

A description is now given, with reference to the flow chart of FIG. 26, of the operation of the machine translation unit 2 shown in FIG. 20 when outputting the above-described request signal.

In the machine translation unit 2, processes similar to those in steps S71 through S78 of FIG. 23 are executed in steps S91 through S98, respectively.

After the processing of step S98, the process proceeds to step S99. In step S99, the conversion-result correcting portion 29 determines whether the inter-word distance of the language information of the output language converted from the substituted text is the same as that of the language information stored in the conversion result buffer 30. If the result of step S99 is no, the process proceeds to step S100 in which the conversion-result correcting portion 29 selects the language information having the smallest inter-word distance, as in step S79 of FIG. 23.

The process then proceeds to step S96. In step S96, the conversion-result correcting portion 29 outputs the selected language information to the text generator 23, which then forms text of the output language translated from the input text. The processing is then completed.

If it is found in step S99 that the inter-word distances of the above-described two items of language information are equal to each other, the process proceeds to step S101 in which the conversion-result correcting portion 29 sends a request signal, as the feedback information, for requesting the speech recognition unit 1 to determine the most probable word as the speech recognition result based on the prosody of the input speech corresponding to the homonyms contained in the substituted text and the input text.

In response to the request signal from the conversion-result correcting portion 29, the speech recognition unit 1 determines the most probable word (hereinafter sometimes referred to as the "maximum likelihood word") from the homonyms based on the prosody of the input speech, and supplies it to the machine translation unit 2.

The maximum likelihood word is supplied to the conversion-result correcting portion 29 via the text analyzer 21 and the language converter 22. Then, in step S102, the conversion-result correcting portion 29 selects the language information having the maximum likelihood word, and the process proceeds to step S96. In step S96, the conversion-result correcting portion 29 outputs the selected language information to the text generator 23, and the text generator 23 generates text of the output language translated from the input text. The processing is then completed.

Figure 27:
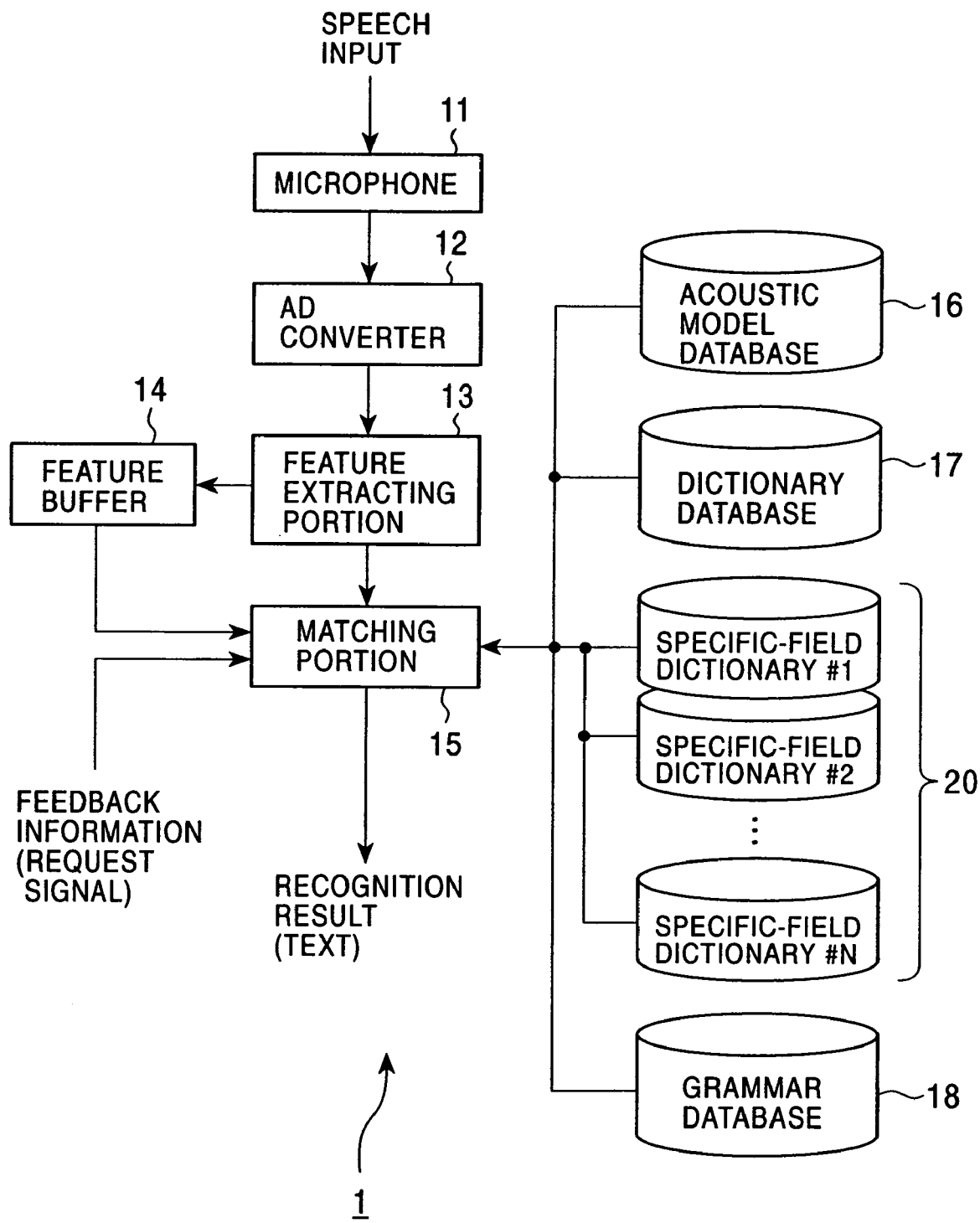
FIG. 27 is a block diagram illustrating a fourth example of the configuration of the speech recognition unit 1.

FIG. 27 illustrates a fourth example of the speech recognition unit 1 shown in FIG. 1. The same elements as those shown in FIG. 3 are designated with like reference numerals. The speech recognition unit 1 shown in FIG. 27 is configured similarly to the counterpart shown in FIG. 3, except that the adaptation processor 19 is eliminated and a specific-field dictionary group 20 consisting of dictionaries sorted according to field are provided.

The specific-field dictionary group 20 is formed of N dictionaries sorted according to field, and each dictionary is basically formed similarly to the word dictionary of the dictionary database 17, except that it stores language models concerning words (phrases) for specific topics and fields, that is, language models sorted according to task.

In the speech recognition unit 1 shown in FIG. 27, the matching portion 15 executes processing by only referring to the acoustic database 16, the dictionary database 17, and the grammar database 18 under normal conditions. However, in response to a request signal from the machine translation unit 2, the matching portion 15 also refers to necessary specific dictionaries of the specific-field dictionary group 20 to execute processing.

Figure 28:
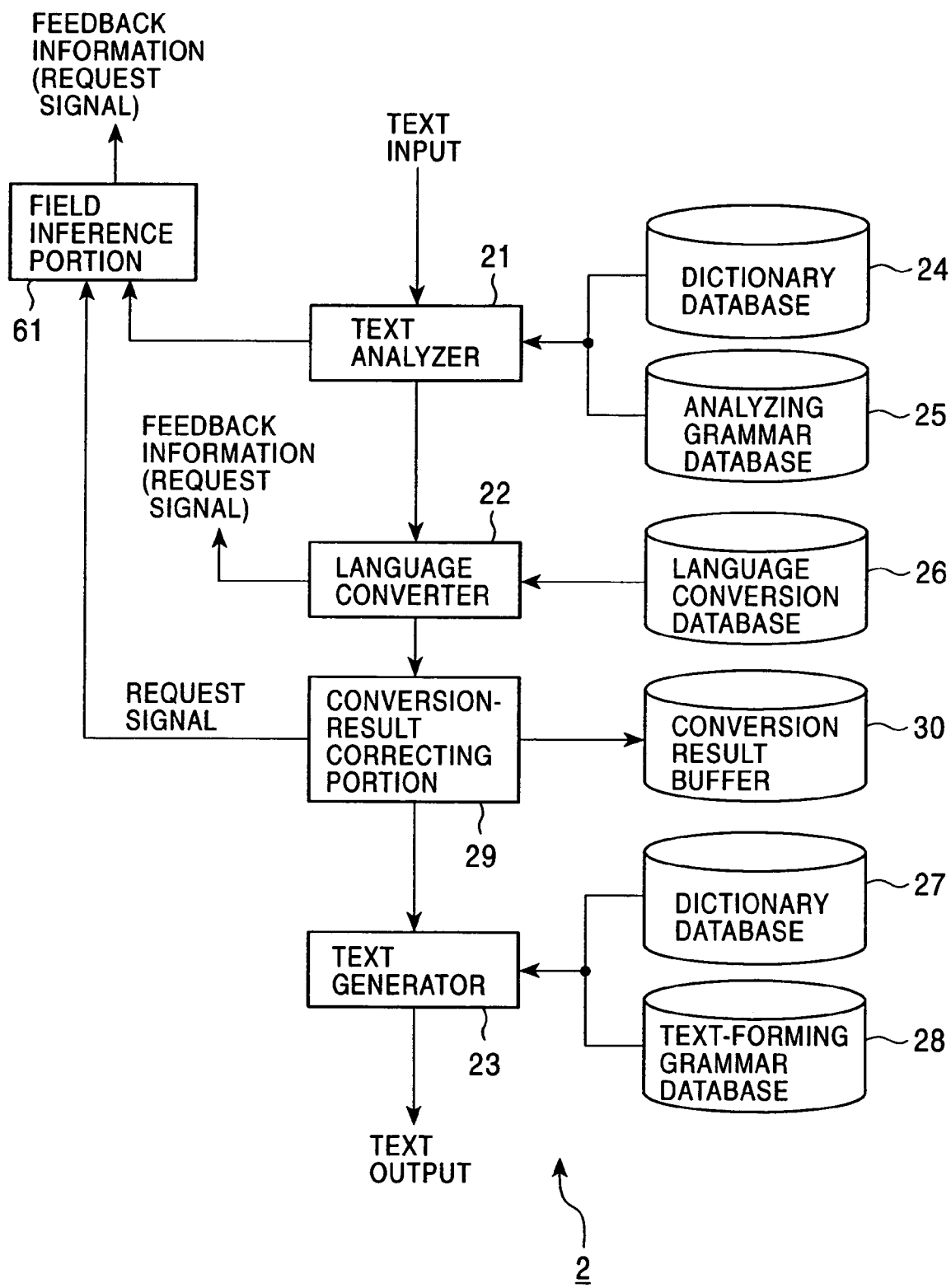
FIG. 28 is a block diagram illustrating a fourth example of the configuration of the machine translation unit 2.

FIG. 28 illustrates a fourth example of the configuration of the machine translation unit 2 shown in FIG. 1 when the speech recognition unit 1 is constructed such as the one shown in FIG. 27. The same elements as those shown in FIG. 20 are indicated by like reference numerals. The machine translation unit 2 shown in FIG. 28 is similarly configured to that shown in FIG. 20, except that a field inference portion 61 is provided.

An analysis result of the input text from the text analyzer 21 and a request signal from the conversion-result correcting portion 29 are supplied to the field inference portion 61. Then, based on the analysis result from the text analyzer 21, i.e., based on the analyses of the speech recognition results of the previously input speech, the field inference portion 61 infers the task, such as the field or the topic, of the user's speech. Upon receiving a request signal from the conversion-result correcting portion 29, the field inference portion 61 sends a request signal, as the feedback information, for requesting the speech recognition unit 1 shown in FIG. 27 to execute processing by referring to the specific dictionary corresponding to the designated field or topic.

Details of the method for inferring the field or the topic from input speech are discussed in, for example, Field inference method in natural-language search system, Katsuhito BESSHO, Naruhito IWASE, Miharu TOBE, and Yoshimi FUKUMURA, IEICE Trans., D-II J81-DII, No. 6 pp. 1317–1327.

Figure 29:
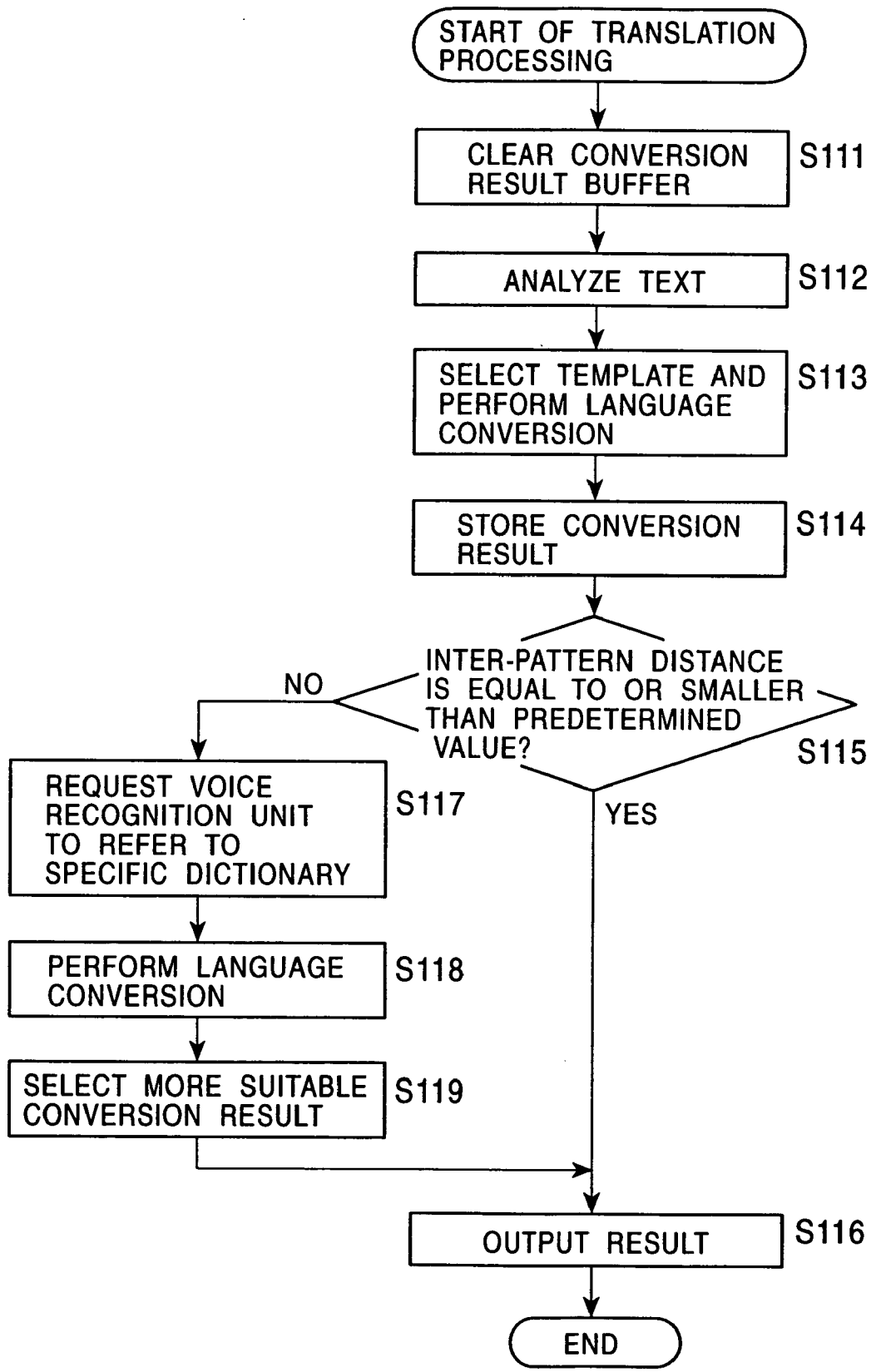
FIG. 29 is a flow chart illustrating the operation of the machine translation unit 2 shown in FIG. 28.

The operation of the machine translation unit 2 shown in FIG. 28 is discussed below with reference to the flow chart of FIG. 29.

In the machine translation unit 2 shown in FIG. 28, processes similar to those of steps S71 through S74 of FIG. 23 are executed in steps S111 through S114, respectively.

After the processing of step S114, the process proceeds to step S115 in which the conversion-result correcting portion 29 determines whether the inter-pattern distance supplied from the language converter 22 is equal to or smaller than a predetermined reference value. If the result of step S115 is yes, namely, if the speech recognition result is close to the Japanese sentence described in the selected template, it can be inferred that a correct recognition result is obtained without the use of the specific-field dictionary group 20 of the speech recognition unit 1 shown in FIG. 27. Then, the process proceeds to step S116 in which the conversion-result correcting portion 29 outputs the language information of the output language stored in the conversion result buffer 30 in step S114 to the text generator 23. The text generator 23 then forms text of the output language translated from the input text. The processing is then completed.

Conversely, if it is found in step S115 that the inter-pattern distance is greater than the predetermined reference value, namely, if the speech recognition result is not close to the Japanese sentence described in the selected template, it can be inferred that a correct recognition result cannot be obtained unless the specific-field dictionary group 20 is used as well as the ordinary databases. Then, the process proceeds to step S117 in which the conversion-result correcting portion 29 sends the field inference portion 61 a request signal for requesting the execution of speech recognition processing with the use of the specific-field dictionary group 20.

The field inference portion 61 infers the topic or field of the input speech by referring to the output of the text analyzer 21. Upon receiving a request signal from the conversion-result correcting portion 29, the field inference portion 61 supplies a request signal, as the feedback information, for requesting the speech recognition unit 1 to execute processing by referring to the specific dictionary associated with the inferred topic or field.

More specifically, if the field inference portion 61 infers that the topic of the input speech is concerned with traveling, it sends a request signal for requesting the speech recognition unit 1 to execute processing by referring to the specific dictionary for registering the names of sightseeing spots.

In this case, by using the feature parameters stored in the feature buffer 14, the speech recognition unit 1 performs speech recognition processing by further referring to the specific dictionary for registering the words (phrases) associated with the topic or field in accordance with the request signal. That is, the vocabularies used for speech recognition can be extended in performing speech recognition processing. The speech recognition result obtained as discussed above is then supplied to the machine translation unit 2 shown in FIG. 28.

Upon receiving the new recognition result, in step S118, in the machine translation unit 2, the text analyzer 21 and the language converter 22 execute processing on the input text as the new recognition result, and the processed result is output to the conversion-result correcting portion 29.

Upon receiving the language information of the output language from the language converter 22, in step S119, the conversion-result correcting portion 29 compares the received language information with that stored in the conversion result buffer 30, and selects a more suitable one. More specifically, the conversion-result correcting portion 29 selects the language information having a smaller inter-pattern distance.

The process then proceeds to step S116 in which the conversion-result correcting portion 29 outputs the selected language information to the text generator 23. Thereafter, the text generator 23 performs processing similar to the one discussed above. The processing is then completed.

As discussed above, the machine translation unit 2 feeds back a request signal, as the feedback information, to the speech recognition unit 1 according to a result of the processing which has been half done. In response to this request signal, the speech recognition unit 1 performs appropriate processing accordingly. It is thus possible to perform high-level natural language processing on the input speech.

That is, the speech recognition unit 1 performs relatively simple speech recognition processing, and when a question arises or information is required in the machine translation unit 2 while processing the received recognition result, the machine translation unit 2 requests the speech recognition unit 1 to perform processing for solving the question or to send the required information. As a result, high-level natural language processing can be easily performed on the input speech in the machine translation unit 2.

In this case, it is not necessary to instruct the user to re-issue the speech or to check with the user whether the speech recognition result is correct.

Although in this embodiment the machine translation unit 2 conducts translation by the use of the templates having the Japanese sentence patterns, other types of templates, such as examples of usage, may be used.

The above-described processes may be executed by hardware or software. If software is used to execute the processes, the corresponding software program is installed into a computer which is built in a dedicated speech processing system, or into a general-purpose computer.

A description is given below, with reference to FIGS. 30A, 30B, and 30C, a recording medium for storing the program implementing the above-described processes which is to be installed into a computer and executed by the computer.

Figure 30A:
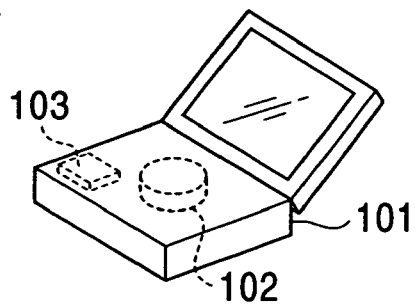
FIGS. 30A, 30B, and 30C illustrate recording media according to the present invention.

The program may be stored, as illustrated in FIG. 30A, in a recording medium, such as a hard disk 102 or a semiconductor memory 103, which is built in a computer 101.

Figure 30B:
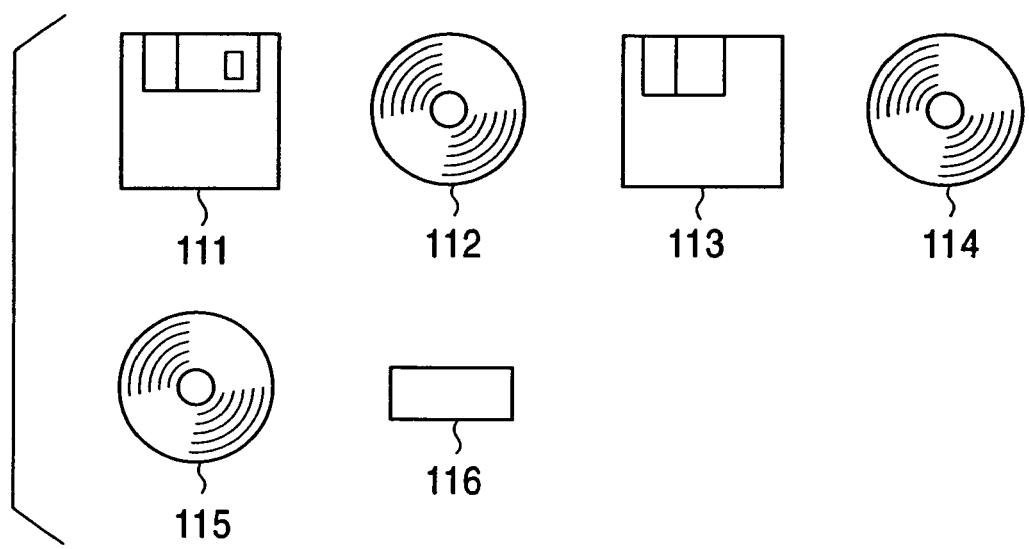

Alternatively, the program may be stored (recorded), as shown in FIG. 30B, temporarily or permanently in a recording medium, such as a floppy disk 111, a compact disc-read only memory (CD-ROM) 112, a magneto optical (MO) disk 113, a digital versatile disc (DVD) 114, a magnetic disk 115, or a semiconductor memory 116. Such a recording medium can be provided by so-called package software.

Figure 30C:
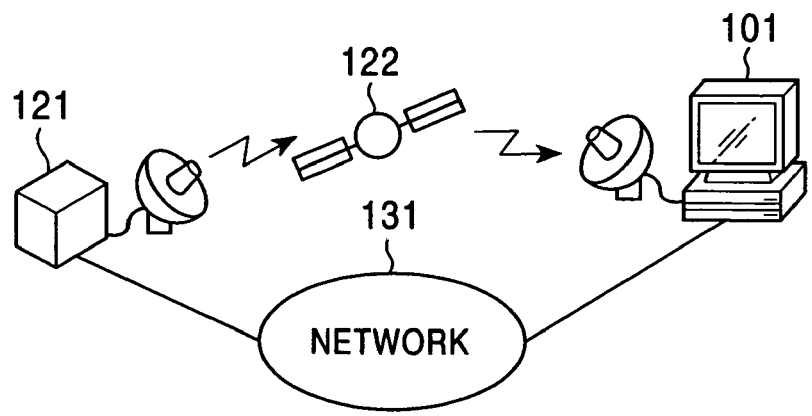

The program may also be transferred, as illustrated in FIG. 30C, to the computer 101 by radio from a download site 121 via a digital-broadcast artificial satellite 122, or may be transferred by cable to the computer 101 via a network 131, such as a local area network (LAN) or the Internet, and may be then installed in the hard disk 102 built in the computer 101.

In this specification, it is not essential that the steps of the program implementing the above-described processes be executed in time series according to the order indicated in the flow charts, and they may be processed individually or concurrently (parallel processing and object processing may be performed to implement the above-described steps).

The program may be executed by a single computer, or a plurality of computers may be used to perform distributed processing on the program. Alternatively, the program may be transferred to a distant computer and executed.

FIG. 31 illustrates an example of the configuration of the computer 101 shown in FIG. 30. The computer 101 has a built-in central processing unit (CPU) 142. An input/output interface 145 is connected to the CPU 142 via a bus 141. When an instruction is input from a user by operating an input unit 147, such as a keyboard or a mouse, into the CPU 142 via the input/output interface 145, the CPU 142 executes the program stored in a read only memory (ROM) 143, which corresponds to the semiconductor memory 103 shown in FIG. 30A. Alternatively, the CPU 142 loads the following type of program into a random access memory (RAM) 144 and executes it: a program stored in the hard disk 102, a program transferred from the satellite 122 or the network 131 to a communication unit 148 and installed in the hard disk 102, or a program read from the floppy disk 111, the CD-ROM 112, the MO disk 113, the DVD 114, or the magnetic disk 115 loaded in a drive 149 and installed in the hard disk 102. Then, the CPU 142 outputs the processed result to a display unit 146 formed of, for example, a liquid crystal display (LCD), via the input/output interface 145.

What is claimed is:

1. A speech processing system comprising:
    a speech recognition unit configured to receive and perform speech recognition on input speech to produce a speech recognition result using acoustic models; and
    a natural-language processor configured to perform natural language processing on said speech recognition result, said natural-language processor including:
        a speech zone detector configured to detect correct zones from said speech recognition result;
        a feedback unit configured to feed back information obtained as a result of the natural language processing performed on said speech recognition result to said speech recognition unit, the feedback information including said detected correct zones,
wherein said speech recognition unit includes
an adaptation processor to process the feedback information from said feedback unit to adapt said acoustic models so that said speech recognition unit produces the speech recognition result with higher precision than when said adaptation processor is not used.

* * * * *